United States Patent
Honda et al.

(10) Patent No.: US 7,249,258 B2
(45) Date of Patent: Jul. 24, 2007

(54) METHOD AND SYSTEM FOR ASSURING AN ORIGINAL

(75) Inventors: Yoshinori Honda, Yokohama (JP); Yoshinobu Tanigawa, Kawasaki (JP); Koji Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 910 days.

(21) Appl. No.: 10/234,462

(22) Filed: Sep. 5, 2002

(65) Prior Publication Data

US 2004/0006692 A1    Jan. 8, 2004

(30) Foreign Application Priority Data

Jul. 2, 2002   (JP) .............................. 2002-192870

(51) Int. Cl.
*H04L 9/00* (2006.01)

(52) U.S. Cl. ...................... 713/176; 713/168; 382/276; 705/75

(58) Field of Classification Search .................... None
See application file for complete search history.

(56) References Cited

U.S. PATENT DOCUMENTS

| 5,136,646 A | 8/1992 | Haber et al. |
| 5,956,404 A | 9/1999 | Schneier et al. |
| 6,868,406 B1 * | 3/2005 | Ogg et al. .................... 705/60 |

FOREIGN PATENT DOCUMENTS

| JP | 2001-331104 A | 11/2001 |
| JP | 3278721 | 2/2002 |
| WO | WO 92/03000 | 2/1992 |

OTHER PUBLICATIONS

Schneier, Bruce, Applied Cryptography, Second Edition: Protocols, Algorithms, and Source Code in C. John Wiley & Sons,☐☐Inc., 1996. pp. 48-49.*

(Continued)

*Primary Examiner*—Kambiz Zand
*Assistant Examiner*—Roderick Tolentino
(74) *Attorney, Agent, or Firm*—Mattingly, Stanger, Malur & Brundidge, P.C.

(57) ABSTRACT

In using log lists of chain signatures to assure validity of an original, work of opening log lists to the public is reduced. A first signature server 2 generates a first chain signature to an original as an object of assurance, adds the generated first chain signature to a first log list, associating the first chain signature with the original, and sends a first certificate of custody including the first chain signature, to the sender of the original. Further, the first signature server 2 sends an arbitrary first chain signature in the log list to a second signature server 3, to receive a second certificate of custody. On the other hand, the second signature server 3 generates a second chain signature to the first chain signature received from the first signature server 2, adds the second chain signature to a second log list, associating the second chain signature with the first chain signature, and sends a second certificate of custody including the second chain signature, to the sender of the first chain signature. Further, the second signature server 3 sends an arbitrary second chain signature in the second log list to a public server 4.

10 Claims, 17 Drawing Sheets

OTHER PUBLICATIONS

Alibi Establishment for Electronic Signatures: How to prove that you did not make the electronic signature in question even when the base cryptosystem was collapsed Part 1. Concepts and Basic Schenes, Tsuyoshi Matsumoto and others.

"Alibi Establishment for Electronic Signatures; How to prove that you did not make electronic signature in question even when the base cryptostem was collapsed" Part 2. Concrete Schemes and Evaluation Seiichi Susaki and others.

B. Schneier "Applied Cryptography Second Edition", John Wiley & Sons, Inc. 1996, pp. 75-79.

* cited by examiner

FIRST SIGNATURE SERVER 2

FIG.6

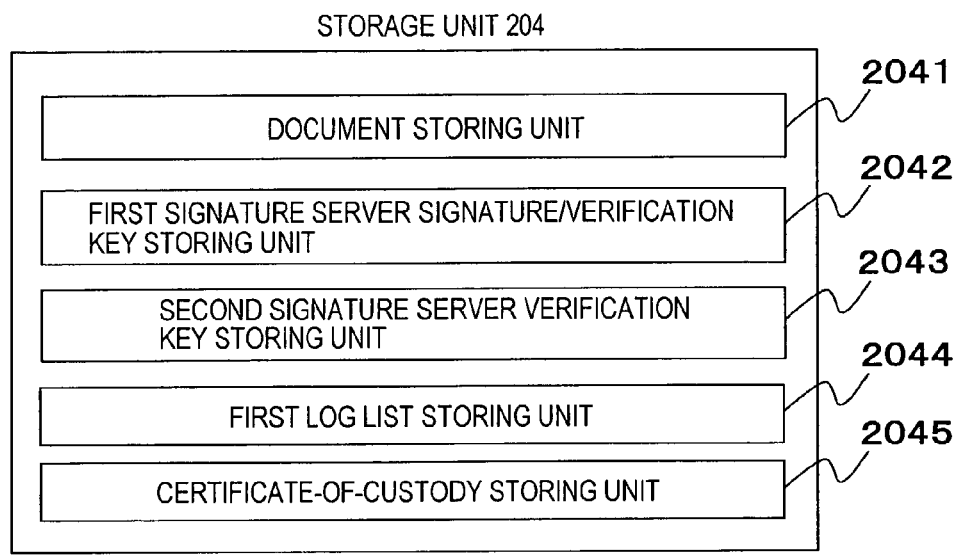

STORAGE UNIT 204

- DOCUMENT STORING UNIT — 2041
- FIRST SIGNATURE SERVER SIGNATURE/VERIFICATION KEY STORING UNIT — 2042
- SECOND SIGNATURE SERVER VERIFICATION KEY STORING UNIT — 2043
- FIRST LOG LIST STORING UNIT — 2044
- CERTIFICATE-OF-CUSTODY STORING UNIT — 2045

FIG.7

FIRST LOG LIST STORING UNIT 2044

| FIRST SIGNATURE ID (20441) | FIRST CHAIN SIGNATURE (20442) | DOCUMENT ID (20443) | TRANSMISSION FLAG (20444) |
|---|---|---|---|
| 0001 | ****** | **** | NOT SENT |
| 0002 | ****** | **** | NOT SENT |
| 0003 | ****** | **** | SENT |
| 0004 | ****** | **** | NOT SENT |
| ⋮ | ⋮ | ⋮ | ⋮ |

20445

SECOND SIGNATURE SERVER 3

SECOND LOG LIST STORING UNIT 3043

| SECOND SIGNATURE ID (30431) | SECOND CHAIN SIGNATURE (30432) | FIRST SIGNATURE ID (30433) | TRANSMISSION FLAG (30434) |
|---|---|---|---|
| 0001 | ****** | **** | NOT SENT |
| 0002 | ****** | **** | NOT SENT |
| 0003 | ****** | **** | SENT |
| 0004 | ****** | **** | NOT SENT |
| ⋮ | ⋮ | ⋮ | ⋮ |

30435

PUBLIC SERVER 4

SECOND SIGNATURE SERVER

METHOD AND SYSTEM FOR ASSURING AN ORIGINAL

BACKGROUND OF THE INVENTION

The present invention relates to a technique of assuring validity of an original, utilizing digital signature.

Recently, digital signature becomes more important as electronic commerce or the like becomes widespread. General structure of digital signature is as follows.

Namely, a signer generates a digital signature A by applying his secret key to a message digest (for example, a hash value) of a message M. Then, he sends the message M together with the digital signature A to a counterpart. On the other hand, a verifier compares a result of applying a signer's public key to the digital signature A with the message digest obtained from the message M, and examines whether both coincide, to verify the signature. When both coincide, it is assured that the digital signature A is the signature generated by the signer to the message M.

Here, it is necessary that a secret key used for a signature has not to be used illegally by a third party. It is considered that the secret key is illegally acquired not only by leakage owing to defective management but also by calculation from a public key. Although the calculation from the public key is difficult from a viewpoint of calculation volume at present, it may become possible in the future, owing to enhancement in computer performance or improvement in calculation algorithm. Once the secret key is acquired illegally, an illegitimate third party can rewrite a message M and generate a digital signature A to the message M. In that case, generation of the digital signature by an illegal third party who rewrites the message M can not be detected by the above-described method of using the public key to verify the digital signature A.

Accordingly, as a countermeasure against such a threat, a technique of Japanese Unexamined Patent Application Laid-Open No. 2001-331104 is proposed. In that technique, a secret key is applied to a hash value of a message as an object of assurance and a hash value of a digital signature to a message received just prior to the message as the object of assurance, in order to generate a digital signature to the message as the object of assurance. Hereinafter, such a digital signature is referred to as a chain signature. Then, this chain signature is added to a log list. Further, an arbitrary chain signature in the log list is made open by a reliable agency periodically.

Further, at the time of verification, the chain signature as an object of verification is verified by using a public key. And, concerning from the chain signatures registered in the log list after the chain signature as the object of the verification to the a chain signature made open by the reliable agency, a connection between each chain signature and a preceding or a following chain signature is verified. Here, a tampering of the chain signature made open by the reliable agency can be easily detected by comparing the chain signature with its contents made open. Thus, non-tampering of the chain signature as the object of the verification can be confirmed, when the verification of the chain signature in question using the public key is completed, the verification of the connection between the above-mentioned each chain signature and the preceding signature or the following chain signature is completed, and non-tampering of the opened chain signature is confirmed.

SUMMARY OF THE INVENTION

As described above, in the technique described in the Japanese Unexamined Patent Application Laid-Open No. 2001-331104, it is required that a reliable agency periodically opens an arbitrary chain signature in the log list. When the technique described in Japanese Unexamined Patent Application Laid-Open No. 2001-331104 becomes widespread and the number of messages as objects of assurance becomes vast, it is considered providing a plurality of servers used for generation of chain signatures and storage of log lists, in order to distribute loads. In that case, when each of the plurality of servers sends a chain signature to be opened to the reliable agency, work of opening the signatures increases in proportion to the number of the servers. For example, it is assumed that there are ten servers, and each server sends its log once a week to a server of a newspaper publishing company or the like, requesting the company to report a chain signature in the newspaper. In this case, there occurs work of reporting ten chain signatures in the newspaper a week.

The present invention has been made considering the above situations. And, an object of the present invention is to realize reduction of work of opening lists to the public, in a technique that uses a log list of chain signatures to assure validity of the original, such as the technique described in the above-mentioned patent document.

To solve the above-described problem, the present invention assures validity of the original, using a plurality of first signature servers 2 and a second signature server that supervises the mentioned plurality of first signature servers.

Namely, in generating signatures for assuring validity of the original, the plurality of first signature servers each generates a first chain signature to the original as an object of assurance, and adds this first chain signature to a first log list, which is managed by the first signature server itself, associating the first chain signature with the above-mentioned original or a message digest thereof. Further, the first signature server in question sends a first certificate of custody, which includes that first chain signature, to the sender of the original as the object of assurance. Further, the first signature server in question sends an arbitrary first chain signature in the first log list to the second signature server, and receives a second certificate of custody from the second signature server.

On the other hand, the second signature server generates the second chain signature to the first chain signature received from the first signature server, and adds this second chain signature to a second log list that is managed by the second signature server itself, associating the second chain signature with the first chain signature or a message digest thereof. Further, the second signature server sends the second certificate of custody, which includes the second chain signature, to the sender of the first chain signature (i.e., the first signature server). Further, the second signature server sends an arbitrary second chain signature in the second log list to an external server (for example, a public server operated by a reliable agency), and at the same time, manages its transmission log.

According to thus-described arrangement, even when the plurality of first signature servers for generating chain signatures and storing log lists are provided in order to distribute loads, only the second signature server works at transmission to the external server, for the purpose of opening to the public. Thus, it is possible to prevent increasing of works required for opening lists to the public, even when the number of servers increases.

In the above-described configuration, verification of validity of the original can be performed as follows.

Namely, when the first signature server receives a first certificate of custody with respect to an original as an object of assurance, then, the first signature sever verifies a part of the first log list, i.e., the part ranging from the first chain signature included in the first certificate of custody, to the first chain signature that is newer than the first chain signature included in the first certificate of custody and that has been sent to the second signature server, to confirm that there is no tampering in that part. Then, the first signature server sends the second certificate of custody with respect to the first chain signature that has been sent to the second signature server, to the second signature server, to acquire from the second signature server, a part of the second log list, i.e., the part ranging from the second chain signature to this first chain signature, to the second chain signature that is newer than the second chain signature and that has been sent to the external server, to verify that part, and to confirm that there is no tampering in that part. Or, the first signature server requests the second signature server to verify the above-mentioned part of the second log list.

On the other hand, when the second signature server receives the second certificate of custody from the first signature server, the second signature server sends to the sender of the second certificate of custody (i.e., the first signature server), the part of the second log list, i.e., the part ranging from the second chain signature included in the second certificate of custody, to the second chain signature that is newer than the above-mentioned second chain signature included in the second certificate of custody and that has been sent to the external server. Or, the second signature server verifies the above-mentioned part of the second log list, to confirm that there is tampering in that part.

In detail, in generating signatures used for assurance of validity of the original, the first signature servers and the second signature server perform the following processing, for example.

(1) When one of the above-mentioned first signature servers receives n-th (n≧2) digital data as the original as an object of assurance, the first signature server in question generates a digital signature for the n-th digital data and an (n−1)-th first chain signature registered in a first log list, includes the generated digital signature and a message digest of the (n−1)-th first chain signature, into an n-th first chain signature, and adds the n-th first chain signature to said first log list, associating said n-th first chain signature with said n-th digital data. Further, the first signature server sends a first certificate of custody including this n-th first chain signature to the sender of the n-th digital data. Further, the first signature server sends an m-th (m≧2) first chain signature in the above-mentioned first log list to the second signature server, receives from the second signature server, a second certificate of custody to the m-th first chain signature, and stores this second certificate of custody.

(2) When the above-mentioned second signature server receives a j-th (j≧2) first chain signature from one of the first signature servers, the second signature server generates a digital signature to the j-th first chain signature and a (j−1)-th second chain signature registered in a second log list, includes the generated digital signature and a message digest of the (j−1)-th second chain signature, into a j-th second chain signature, and adds the j-th second chain signature to the second log list, associating the j-th second chain signature with the j-th first chain signature. Further, the second signature server sends a second certificate of custody including this j-th second chain signature to the first signature server in question. Further, the second signature server sends a k-th (k≧2) second chain signature in the second log list to the external server.

Further, more specifically, in verifying validity of the original, the first signature servers and the second signature server perform, the following processing, for example.

(3) When one of the above-mentioned first signature servers receives a first certificate of custody with respect to the original as an object of verification, then, with respect to first chain signatures ranging from the h-th (h≧1) first chain signature included in the first certificate of custody to an i-th (i>h) first chain signature that has been sent to said second signature server, the first signature server in question verifies each first chain signature (referred to as a d-th first chain signature) in those first chain signatures, by verifying the d-th (h<d≦i) first chain signature in turn, using the d-th and (d−1)-th first chain signatures included in the first log list. This verification process of the d-th first chain signature is performed by comparing a message digest of the (d−1)-th first chain signature with the message digest (of the (d−1)-th first chain signature) included in the d-th first chain signature as its part. Further, the first signature server sends to that second signature server, a second certificate of custody, which has been received from the second signature server by sending the i-th first chain signature to the second signature server, to acquire a part of the second log list, i.e., the part including second chain signatures ranging from the e-th (e≧1) second chain signature included in the second certificate of custody to an f-th (f>e) second chain signature sent by the second signature server to the external server. And, with respect to the second chain signatures ranging from the e-th second chain signatures to the f-th second chain signatures, the first signature server verifies each second chain signature (referred to as a c-th second chain signature) in those second chain signatures, by verifying the c-th (e<c≦f) second chain signature in turn, using the c-th and (c−1)-th second chain signatures included in the above-mentioned part of the second log list. This verification process of the c-th second chain signature is performed by comparing a message digest of the (c−1)-th second chain signature with the message digest (of the (c−1)-th second chain signature) included in the c-th second chain signature as its part.

(4) When the above-mentioned second signature server receives the second certificate of custody from one of the first signature servers, then, the second signature server reads the above-mentioned part of the second log list, which includes the second chain signatures ranging from the e-th second chain signature included in said second certificate of custody to the f-th second chain signature sent to the external server, from the second log list, and sends that part to the first signature server.

Alternatively, (3') when one of the above-mentioned first signature servers receives a first certificate of custody with respect to the original as an object of verification, then, with respect to first chain signatures ranging from the h-th (h≧1) first chain signature included in the first certificate of custody to the (i+1)-th first chain signature that is just after the i-th (i>h) first chain signature that has been sent to the second signature server, the first signature server in question verifies each first chain signature (referred to as a d-th first chain signature) in those first chain signatures, by verifying the d-th (h<d≦i) first chain signature in turn, using the d-th and (d−1)-th first chain signatures included in the first log list. This verification of the d-th first chain signature is performed by comparing a message digest of the (d−1)-th first chain signature with the message digest (of the (d−1)-th first chain signature) included in the d-th first chain signature as its part. Further, the first signature server sends to that second signature server, a second certificate of custody, which has been received from the second signature server by sending the i-th first chain signature to the second signature server.

(4') When the second signature server receives the second certificate of custody from one of said first signature servers, then, with respect to second chain signatures ranging from an e-th ($e \geq 1$) second chain signature included in the second certificate of custody to an f-th (f>e) second chain signature sent to the external server, the second signature server verifies each second chain signature (referred to as a c-th second chain signature) in those second chain signatures, by verifying the c-th ($e<c \leq f$) second chain signature in turn, using the c-th and (c−1)-th second chain signatures included in the second log list. This verification of the c-th second chain signature is performed by comparing a message digest of the (c−1)-th second chain signature with the message digest (of the (c−1)-th second chain signature) included in the c-th second chain signature as its part.

BRIEF DESCRIPTION OF THE DRAWINGS

FIG. 6 is a diagram showing a configuration of the storage unit 204 shown in FIG. 4;

FIG. 7 is a diagram showing an example of contents of registration in the first log list storing unit 2044 shown in FIG. 6;

DETAILED DESCRIPTION OF THE PREFERRED EMBODIMENTS

Now, embodiments of the present invention will be described.

Figure 1:
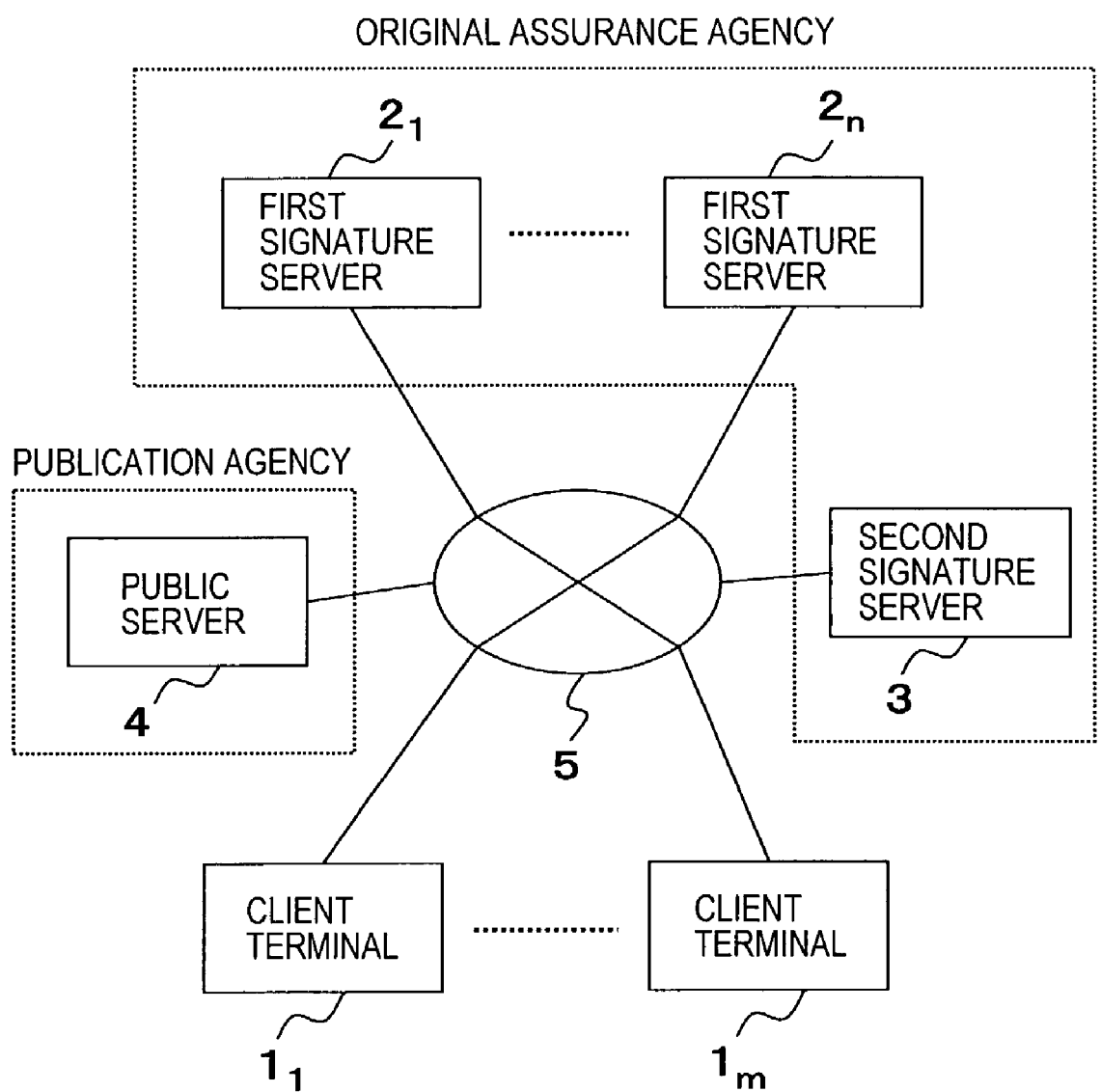
FIG. 1 is a schematic block diagram showing an the original assurance system to which one embodiment of the present invention is applied.

FIG. 1 is a schematic diagram showing a system for assuring an original, to which one embodiment of the present invention is applied.

In FIG. 1, each of client terminals $1_1$-$1_m$ (hereinafter, simply referred to as client terminal 1) is an information processing apparatus used for requesting an agency to assure the original (including electronic document data, multimedia data such as image data or audio data, data corresponding to marketable securities, and the like) and for other purposes. A plurality of first signature servers $2_1$-$2_n$ (hereinafter, simply referred to as first signature server 2) and a second signature server 3, which supervises those first signature servers 2, are information processing apparatuses of the agency for assuring the original. And, a public server 4 is an information processing apparatus (for example, a Web server) of a reliable agency such as a newspaper publishing company, and holds information in a state that browser terminals including the client terminals 1 can browse the information. These apparatuses 1-4 are connected with one another through a network 5 such as LAN or WAN.

Figure 2:
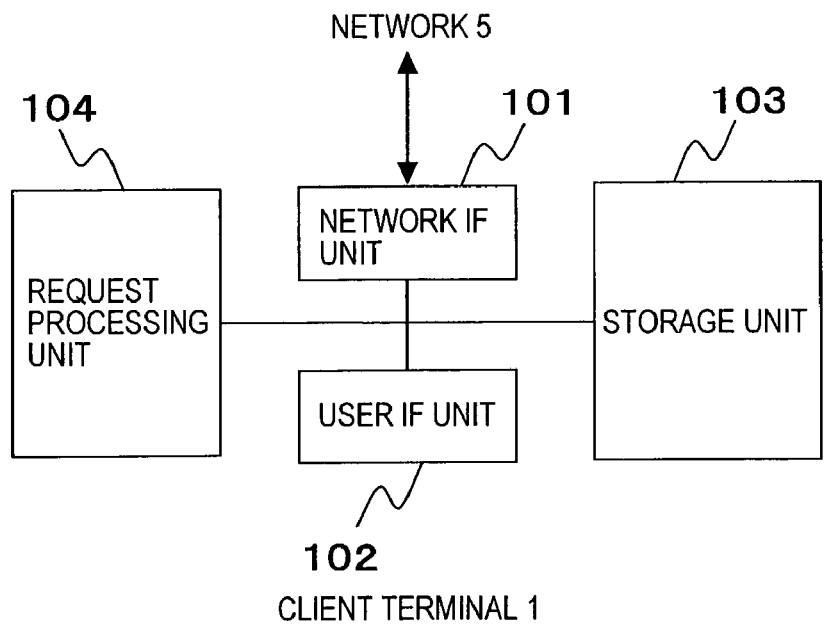
FIG. 2 is a schematic diagram showing the client terminal 1 shown in FIG. 1.

FIG. 2 is a schematic block diagram showing the client terminal 1.

As shown in the figure, the client terminal 1 comprises: a network IF unit 101 that communicates with the servers 2-4 through the network 5; a user IF unit 102 that receives various instructions from a user and displays results to the user; a storage unit 103 that stores digital data, as to which it is to be requested or has been requested to assure the digital data is identical to the original, and a first certificate of custody of the digital data; and a request processing unit 104.

The request processing unit 104 performs processing according to various instructions received from the user through the user IF unit 102.

For example, according to an instruction received from the user through the user IF unit 102, the request processing unit 104 reads from the storage unit 103, digital data as to which it is requested to assure the digital data is identical to the original, sends the digital data to one of the first signature servers 2, and receives a first certificate of custody. Then, the request processing unit 104 stores in the storage unit 103 the first certificate of custody and the address of the first signature server 2 that is the sender of the first certificate of custody, associating them with the digital data as to which it is requested to assure the digital data is identical to the original.

Further, for example, according to an instruction received from the user through the user IF unit 102, the request processing unit 104 reads from the storage unit 103, a first certificate of custody and an address of a first signature server 2 associated with digital data as to which it is requested to confirm the assurance of the original, and sends the first certificate of custody to the first signature server 2 specified by the address. Then, the request processing unit 104 receives a confirmation result on assurance of the original from the first signature server 2, and presents it to the user through a display unit or the like.

Figure 3:
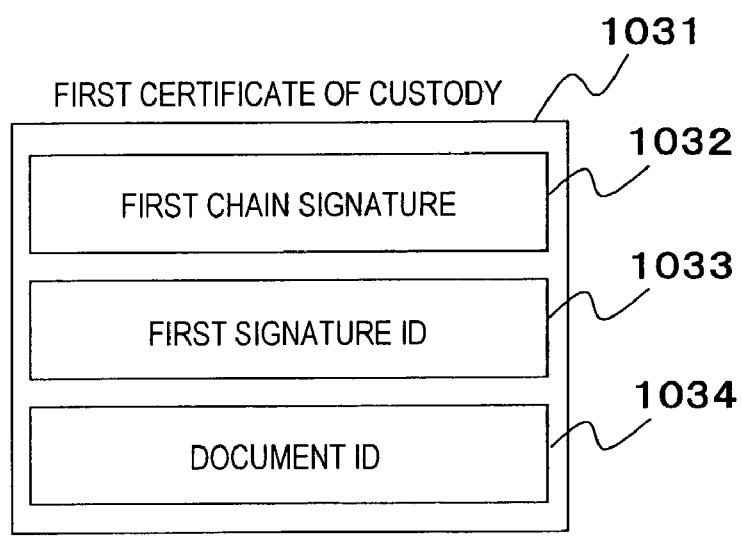
FIG. 3 is a diagram showing an example of data structure of a first certificate of custody.

Here, the first certificate of custody is information including a first chain signature to the digital data as to which it is requested to assure the digital data is identical to the original. FIG. 3 shows an example of data structure of the first certificate of custody. As shown in the figure, a first certificate of custody 1031 comprises: a first chain signature 1032 to digital data as to which it is requested to assure the digital data is identical to the original; a first signature ID 1033 that specifies the first chain signature 1032; and a document ID 1034 that specifies the digital data as the object for assuring the original. Further, the first chain signature includes a digital signature to the digital data as to which it is requested to assure the digital data is identical to the original, and a first chain signature that was generated just before in the first signature server 2 for generating the first chain signature in question.

Figure 22:
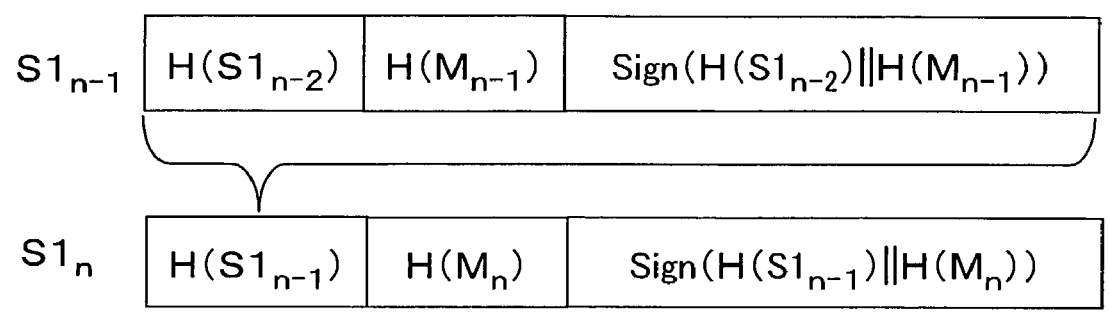
FIG. 22 is a diagram for explaining a method of generating a first chain signature.

Now, referring to FIG. 22, a method of generating the first chain signature will be described.

In the figure, the reference symbol $S1_x$ refers to an x-th first chain signature, $M_x$ to x-th digital data, $H(x)$ to a message digest of data x, and $Sign(x)$ to a digital signature generated by applying the signature key (for example, secret key) of the concerned first signature server 2 itself to the data x.

As shown in the figure, an (n−1)-th first chain signature $S1_{n-1}$ comprises: a message digest $H(S1_{n-2})$ of the (n−2)-th first chain signature $S1_{n-2}$; a message digest $H(M_{n-1})$ of the (n−1)-th digital data $M_{n-1}$; and a digital signature $Sign(H(S1_{n-2})\|H(M_{n-1}))$ to a concatenation of $H(S1_{n-2})$ and $H(M_{n-1})$. Similarly, the n-th first chain signature $S1_n$ comprises: a message digest $H(S1_{n-1})$ of the (n−1)-th first chain signature $S1_{n-1}$; a message digest $H(M_n)$ of the n-th digital data $M_n$; and a digital signature $Sign(H(S1_{n-1})\|H(M_n))$ to a concatenation of $H(S1_{n-1})$ and $H(M_n)$. Thus, a first chain signature is generated such that it creates a connection with the first chain signature generated just before.

Figure 4:
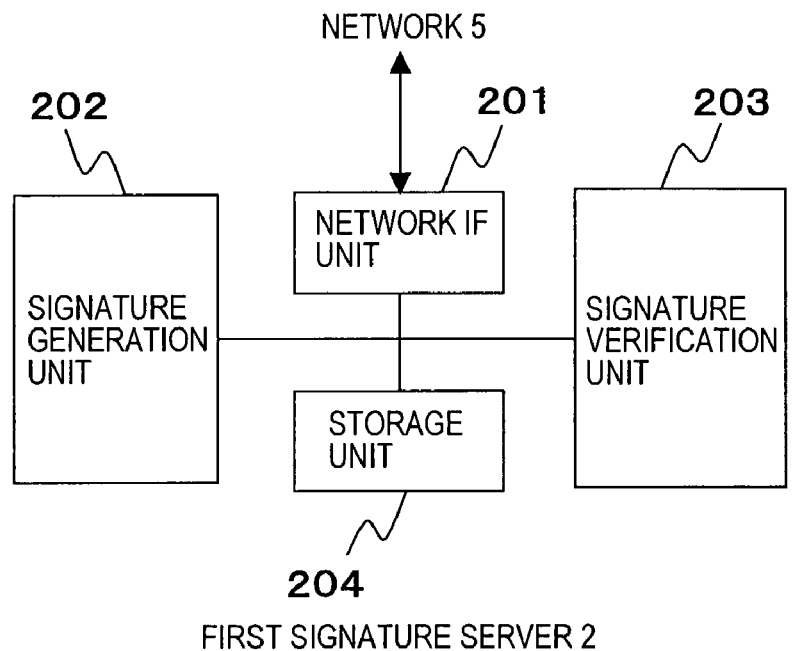
FIG. 4 is a schematic diagram showing the first signature server 2 shown in FIG. 1.

FIG. 4 is a schematic block diagram showing the first signature server 2.

As shown in the figure, the first signature server 2 comprises: a network IF unit 201 that communicates with the client terminal 1 or the server 3 or 4 through the network 5; a signature generation unit 202; a signature verification unit 203; and a storage unit 204.

When the signature generation unit 202 receives from the client terminal 1 through the network IF unit 201, digital data as to which it is requested to assure the digital data is identical to the original, then, assuming that the received digital data is the n-th ($n \geq 2$) digital data $M_n$ that is received by this first signature server 2 as digital data as to which it is requested to assure the digital data is identical to the original, the signature generation unit 202 generates a message digest (for example, a hash value) $H(M_n)$ of the digital data $M_n$. Further, the signature generation unit 202 generates a message digest $H(S1_{n-1})$ of the (n−1)-th first chain signature $S1_{n-1}$ registered in a first log list stored in the storage unit 204. Then, the signature generation unit 202 generates $H(S1_{n-1})\|H(M_n)$ by concatenating $H(S1_{n-1})$ and $H(M_n)$, and applies its own signature key (for example, a secret key) to the concatenation $H(S1_{n-1})\|H(M_n)$ to generate a digital signature $Sign(H(S1_{n-1})\|H(M_n))$. Then, the signature generation unit 202 registers concatenation of $H(S1_{n-1})$, $H(M_n)$ and $Sign(H(S1_{n-1})\|H(M_n))$ as the n-th first chain signature $S1_n = H(S1_{n-1})\|H(M_n)\|Sign(H(S1_{n-1})\|H(M_n))$ into the first log list.

Further, the signature generation unit 202 generates a first certificate of custody that includes the n-th first chain signature, a first-signature ID of that first chain signature, and a document ID of the n-th digital data, and sends the generated first certificate of custody to the client terminal 1 that has requested to assure the original of the n-th digital data, through the network IF unit 201.

Here, to generate a first chain signature, a time stamp system based on the linking Protocol, for example, a hysteresis signature system is employed. The linking Protocol is a technique in which one's own secret key is applied to data, time data and a message relating to generation of a digital signature $A_{n-1}$ generated just before. The linking Protocol is disclosed in Bruce Schneier, "Applied Cryptography, Second Edition", John Wiley & Sons, Inc., 1996, and International Application No. PCT/US91/05386. Further, the hysteresis signature system is described in detail in MATSUMOTO, TSUTOMU, etc., "Mechanism for realizing electronic signature alibi resistant to code-breaking (Part One)—Concept and Outline—", 8th CSES Meeting for Research Presentation, and SUZAKI, MIYAZAKI, TAKARAGI and MATSUMOTO, "Mechanism for realizing electronic signature alibi resistant to code-breaking (Part Two)—Detailed system—", Information Processing Society of Japan, Computer Security Workshop, 8th Meeting for Research Presentation, March, 2000.

Further, when a predetermined event occurs, the signature generation unit 202 generates a signature assurance request including the m-th ($m \geq 2$) first chain signature in the first log list, sends the signature assurance request to the second signature server 3, and receives a second certificate of custody from the second signature server 3. Then, the signature generation unit 202 stores the second certificate of custody into the storage unit 204, associating it with the first chain signature included in the signature assurance request. For example, periodically or each time when a predetermined number of first chain signatures are generated, the signature generation unit 202 sends the signature assurance request that includes the newest first chain signature registered in the first log list to the second signature server 3, receives the second certificate of custody corresponding to that first chain signature from the second signature server 3, and registers the received second certificate of custody into the storage unit 204, associating it with the first chain signature included in the signature assurance request.

Figure 5:
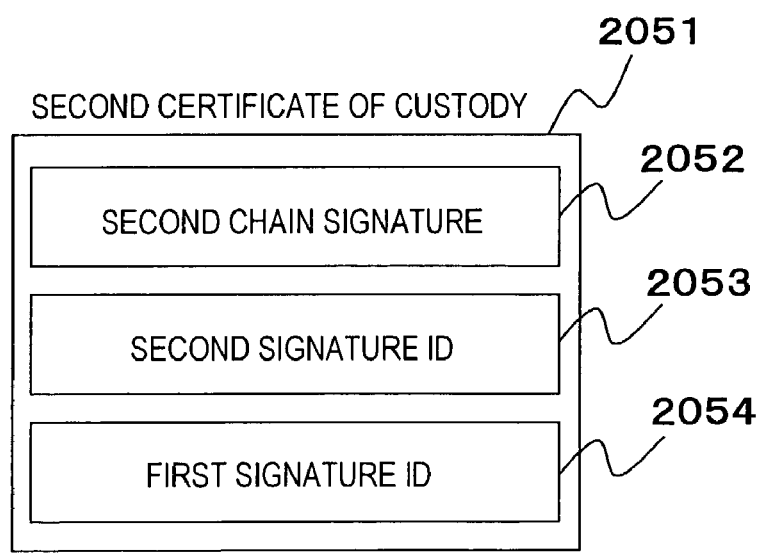
FIG. 5 is a diagram showing an example of data structure of a second certificate of custody.

Here, the second certificate of custody is information that includes a second chain signature to the first chain signature included in the signature assurance request. FIG. 5 shows an example of data structure of the second certificate of custody. As shown in the figure, the second certificate of custody 2051 comprises: a second chain signature 2052 to a first chain signature as to which assurance is requested; a second signature ID 2053 for specifying the second chain signature 2052; and a first signature ID 2054 for specifying the first chain signature as the object of the assurance. Further, the second chain signature includes a digital signature to the first chain signature for which the assurance is requested and a second chain signature generated just before in the second signature server 3 for generating the second chain signature in question.

When the signature verification unit 203 receives a request for confirming the original assurance, accompanied with a first certificate of custody from a client terminal 1 through the network IF unit 201, then, the signature verification unit 203 verifies a part of the first log list, ranging from an h-th (h≧1) first chain signature included in the first certificate of custody to an i-th (i>h) first chain signature that is newer than the h-th first chain signature and has been sent to the second signature server 3 (hereinafter, the part in question is referred to as first chain), in order to verify that there is no tampering in the first chain.

Further, the signature verification unit 203 sends the second signature server 3 a second chain request accompanied by the second certificate of custody to the i-th first chain signature sent to the second signature server 3. Then, the signature verification unit acquires from the second signature server 3, a part of a second log list, ranging from an e-th (e≧1) second chain signature included in the second certificate of custody to an f-th (f>e) second chain signature that is newer than the e-th second chain signature and has been opened by the public server 4 (hereinafter, the part in question is referred to as the second chain), in order to verify that there is no tampering in the second chain. Then, depending on the results of verification of the first and second chains, the signature verification unit 203 sends the verification result on the original assurance to the client terminal 1 through the network IF unit 201. The second log list will be described later.

The storage unit 204 stores information required for various kinds of processing in the signature generation unit 202 and the signature verification unit 203. FIG. 6 shows a configuration of the storage unit 204. As shown in the figure, the storage unit 204 comprises: a document storing unit 2041 for storing digital data as to which it is assured that the digital data is identical to the original; a first signature server signature/verification key storing unit 2042 for storing a signature key and a verification key (for example, a secret key and a public key) of the first signature server 2; a second signature server verification key storing unit 2043 for storing a verification key (for example, a public key) of the second signature server 3; a first log list storing unit 2044 for storing the first log list; and a certificate-of-custody storing unit 2045 for storing the second certificate of custody received from the second signature server 3.

FIG. 7 shows an example of contents of registration in the first log list storing unit 2044. As shown in the figure, one record 20445 is configured by: a field 20441 for registering a first signature ID (for example, a serial number) that specifies a generation order of the first chain signature; a field 20442 for registering a first chain signature that has the first signature ID registered in the field 20441; a field 20443 for registering a document ID that specifies the digital data as the object of the first chain signature registered in the field 20442; and a field 20444 for registering a transmission flag that indicates whether or not the first chain signature registered in the field 20442 has been sent to the second signature server 3.

Figure 8:
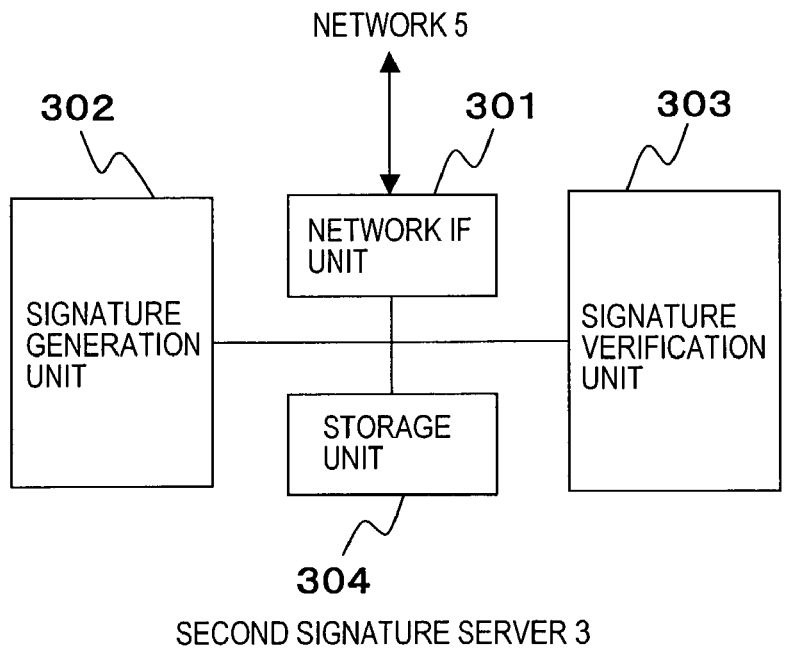
FIG. 8 is a schematic block diagram showing the second signature server 3 shown in FIG. 1.

FIG. 8 is a schematic block diagram showing the second signature server 3.

As shown in the figure, the second signature server 3 comprises: a network IF unit 301 for communicating with the client terminal 1 or the servers 2, 4 through the network 5; a signature generation unit 302; a signature verification unit 303; and a storage unit 304.

Figure 23:
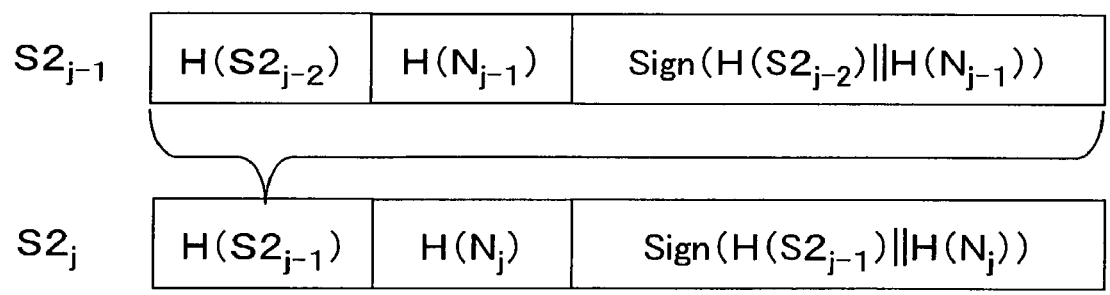
FIG. 23 is a diagram for explaining a method of generating a second chain signature.

Now, referring to FIG. 23, a method of generating the second chain signature will be described.

In the figure, a reference symbol $S2_x$ refers to an x-th second chain signature, $N_x$ refers to the x-th first chain signature received, H(x) refers to a message digest of data x, and Sign(x) refers to a digital signature generated by applying the signature key (for example, secret key) of the second signature server 3 itself to the data x.

As shown in the figure, a (j−1)-th second chain signature $S2_{j-1}$ comprises: a message digest $H(S2_{j-2})$ of the (j−2)-th second chain signature $S2_{j-2}$; a message digest $H(N_{j-1})$ of the (j−1)-th first chain signature $N_{j-1}$ received; and a digital signature $Sign(H(S2_{j-2})\|H(N_{j-1}))$ to a concatenation of $H(S2_{j-2})$ and $H(N_{j-1})$. Similarly, the j-th second chain signature $S2_j$ comprises: a message digest $H(S2_{j-1})$ of the (j−1)-th second chain signature $S2_{j-1}$; a message digest $H(N_j)$ of the j-th first chain signature $N_j$ received; and a digital signature $Sign(H(S2_{j-1})\|H(N_j))$ to a concatenation of $H(S2_{j-1})$ and $H(N_j)$. Thus, a second chain signature is generated such that is creates a connection with the second chain signature generated just before.

When the signature generation unit 302 receives a first chain signature, for which assurance is requested, from the first signature server 2 through the network IF unit 301, then, assuming that the received first chain signature is the j-th (j≧1) first chain signature $N_j$ (for which assurance is requested) received by this second signature server 3, the signature generation unit 302 generates a message digest (for example, a hash value) $H(N_j)$ of this first chain signature $N_j$. Further, the signature generation unit 302 generates a message digest $H(S2_{j-1})$ of the (j−1)-th second chain signature $S2^{j-1}$ registered in the second log list stored in the storage unit 304. Then, the signature generation unit 302 generates $H(S2_{j-1})\|H(N_j)$ by concatenating $H(S2_{j-1})$ and $H(N_j)$, and applies its own signature key (for example, a secret key) to the concatenation $H(S2_{j-1})\|H(N_j)$ to generate a digital signature $Sign(H(S2_{j-1})\|H(N_j))$. Then, the signature generation unit 302 registers concatenation of $H(S2_{j-1})$, $H(N_j)$ and $Sign(H(S2_{j-1})\|H(N_j))$ as the j-th second chain signature $S2_j=H(S2_{j-1})\|H(N_j)\|Sign(H(S2_{j-1})\|H(N_j))$ into the second log list.

Further, the signature generation unit 302 generates a second certificate of custody that includes the j-th second chain signature, a second signature ID of that second chain signature, and the first signature ID of the j-th first chain signature, and sends the generated second certificate of custody to the first signature server 2 that is the source of the request for assurance of the j-th first chain signature, through the network IF unit 301.

Here, similarly to the generation of the first chain signature, the second chain signature is generated employing a time stamp system based on the linking Protocol, for example, a hysteresis signature system.

Further, when a predetermined event occurs, the signature generation unit 302 sends a k-th (k≧2) second chain signature in the second log list to the public server 4, and requests it to open the second chain signature to the public. For example, periodically or each time when a predetermined number of second chain signatures are generated, the signature generation unit 302 sends to the public server 4, an opening request that includes the newest second chain signature registered in the second log list.

When the signature verification unit 303 receives from a first signature server 2, a request for confirming the signature assurance, accompanied with a second certificate of custody, through the network IF unit 301, then, the signature verification unit 303 reads from the second log list stored in the storage unit 304, the second chain, i.e., the part of the second log list ranging from the e-th (e≧1) second chain signature included in this second certificate of custody to the f-th (f>e) second chain signature that is newer than the e-th second chain signature and has been opened by the public server 4. Then, the signature verification unit 303 sends the read second chain to the first signature server 3 that has sent the request for confirming the signature assurance.

Figure 9:
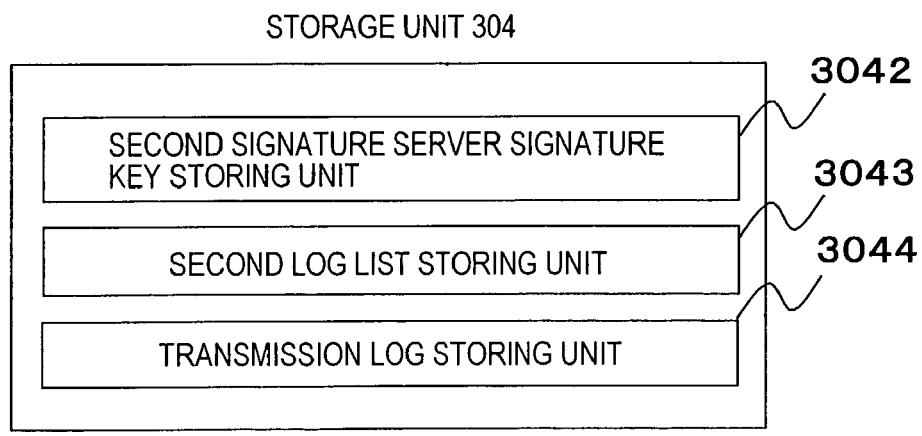
FIG. 9 is a diagram showing a configuration of the storage unit 304 shown in FIG. 8.

The storage unit 304 stores information required for various kinds of processing in the signature generation unit 302 and the signature verification unit 303. FIG. 9 shows a configuration of the storage unit 304. As shown in the figure, the storage unit 304 comprises: a second signature server signature key storing unit 3042 for storing the signature key (for example, secret key) of the second signature server 3; a second log list storing unit 3043 for storing the second log list; and a transmission log storing unit 3044 for storing a log of transmission of the second chain signature to the public server 4.

Figures 10, 11:
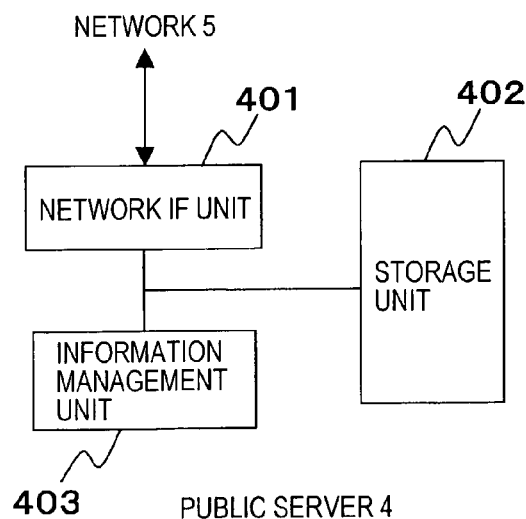
FIG. 10 is a diagram showing an example of contents of registration in the second log list storing unit 3043 shown in FIG. 9.
FIG. 11 is a schematic block diagram showing the public server 4 shown in FIG. 1.

FIG. 10 shows an example of contents of registration in the second log list storing unit 3043. As shown in the figure, one record 30435 is configured by: a field 30431 for registering a second signature ID (for example, a serial number) that specifies a generation order the second chain signature; a field 30432 for registering a second chain signature that has the second signature ID registered in the field 30431; a field 30433 for registering a first signature ID that specifies the first chain signature as the object of the second chain signature registered in the field 30432; and a field 30434 for registering a transmission flag that indicates whether or not the second chain signature registered in the field 30432 has been sent to the public server 4.

FIG. 11 is a schematic block diagram showing the public server 4.

As shown in the figure, the public server 4 comprises: a network IF unit 401 that communicates with the client terminal 1 or the servers 2, 3; a storage unit 402 that stores information as objects of opening to the public; and an information management unit 403.

The information management unit 403 stores a second chain signature and a second signature ID, which are sent from the second signature server 3 through the network IF unit 401, into the storage unit 402. Further, the information management unit 403 sends information stored in the storage unit 402 to browser terminals (including the client terminals 1) that have accessed it, through the network IF unit 401, to permit the browser terminals to browse information stored in the storage unit 402. Here, newly-stored information in the storage unit 402 may be periodically published in a medium such as a newspaper.

Each of the apparatuses 1-4 described in the above can be implemented by an ordinary computer system comprising: a CPU; a memory; an external storage such as an HDD; a reader that reads information from a portable storage medium such as a CD-ROM, a DVD-ROM, or the like; an input unit such as a keyboard or mouse; an output unit such as a display; and a communication unit for communicating with another apparatus through a network; when a predetermined program loaded on the memory is executed by the CPU. Such a predetermined program may be downloaded from a storage medium through the reader or from the network through the communication unit, onto the external storage, then, loaded onto the memory, and executed by the CPU. Or, such a program may be downloaded from a storage medium through the reader or from the network through the communication unit, directly onto the memory, and then executed by the CPU. In that case, the external storage or the memory may be used as the storage units 103, 204, 304 and 402.

Next, operations of the system for assuring the original having the above-described configuration will be described.

First, processing for assuring the original (an original assurance processing) will be described.

Figure 12:
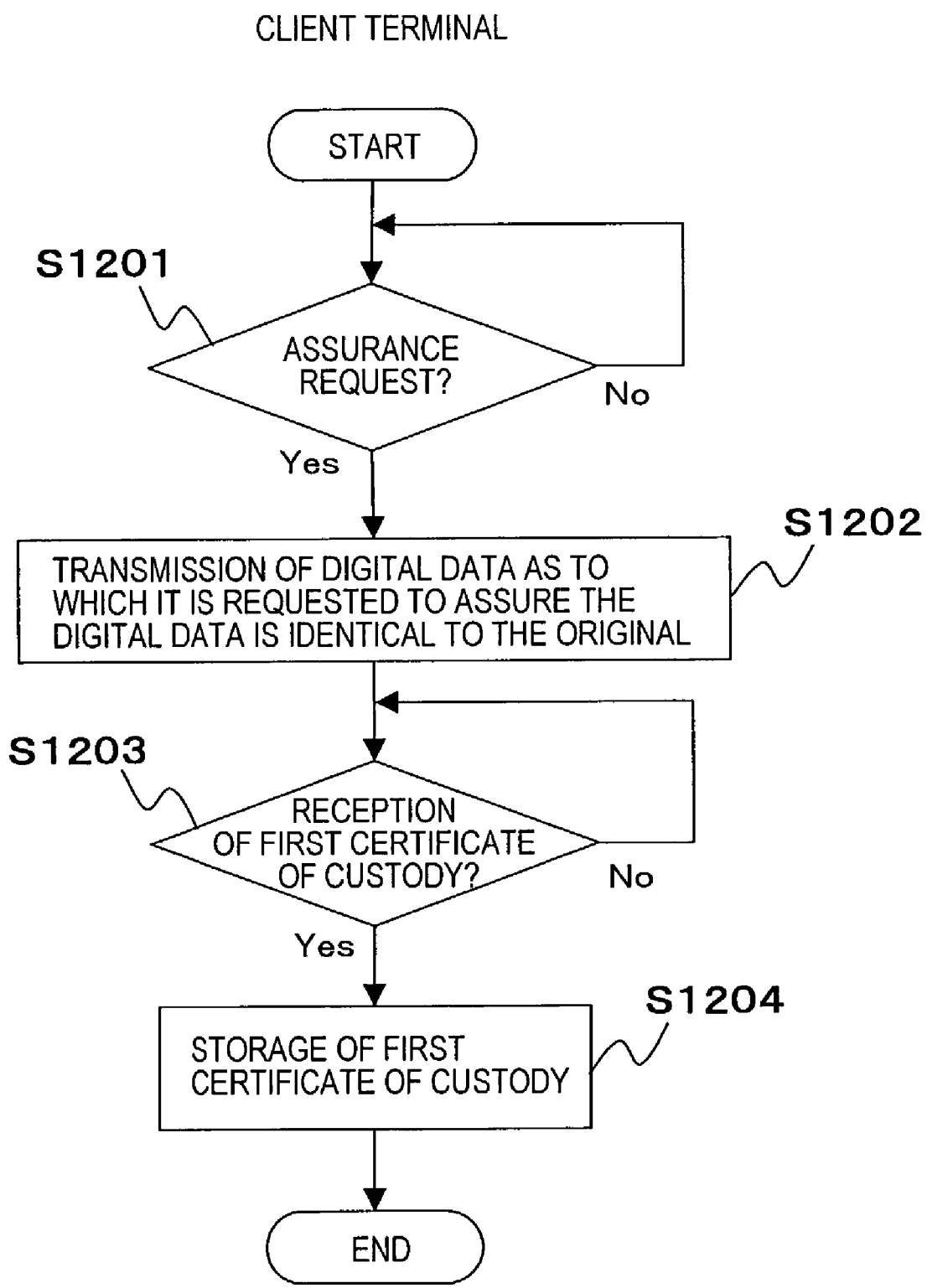
FIG. 12 is a flowchart for explaining operation of the client terminal 1 in processing for assuring the original.

FIG. 12 is a flowchart for explaining an operation of the client terminal 1 in the original assurance processing.

Through the user IF unit 102, the user requests the request processing unit 104 to assure the original, with designation of digital data as to which it is requested to assure the digital data is identical to the original and designation of an address of a first signature server 2 as the destination of the request for the original assurance (S1201). Then, the request processing unit 104 reads the designated digital data from the storage unit 103, and generates an original assurance request including the digital data, and sends the request to the first signature server 2 having the designated address through the network IF unit 101 (S1202).

Next, the request processing unit 104 awaits to receive a first certificate of custody through the network IF unit 101, from the first signature server 2 to which the original assurance request has been sent (S1203). Then, the request processing unit 104 stores the first certificate of custody into the storage unit 103, associating the first certificate of custody with the address of the first signature server 2 and the digital data (S1204).

Figure 13:
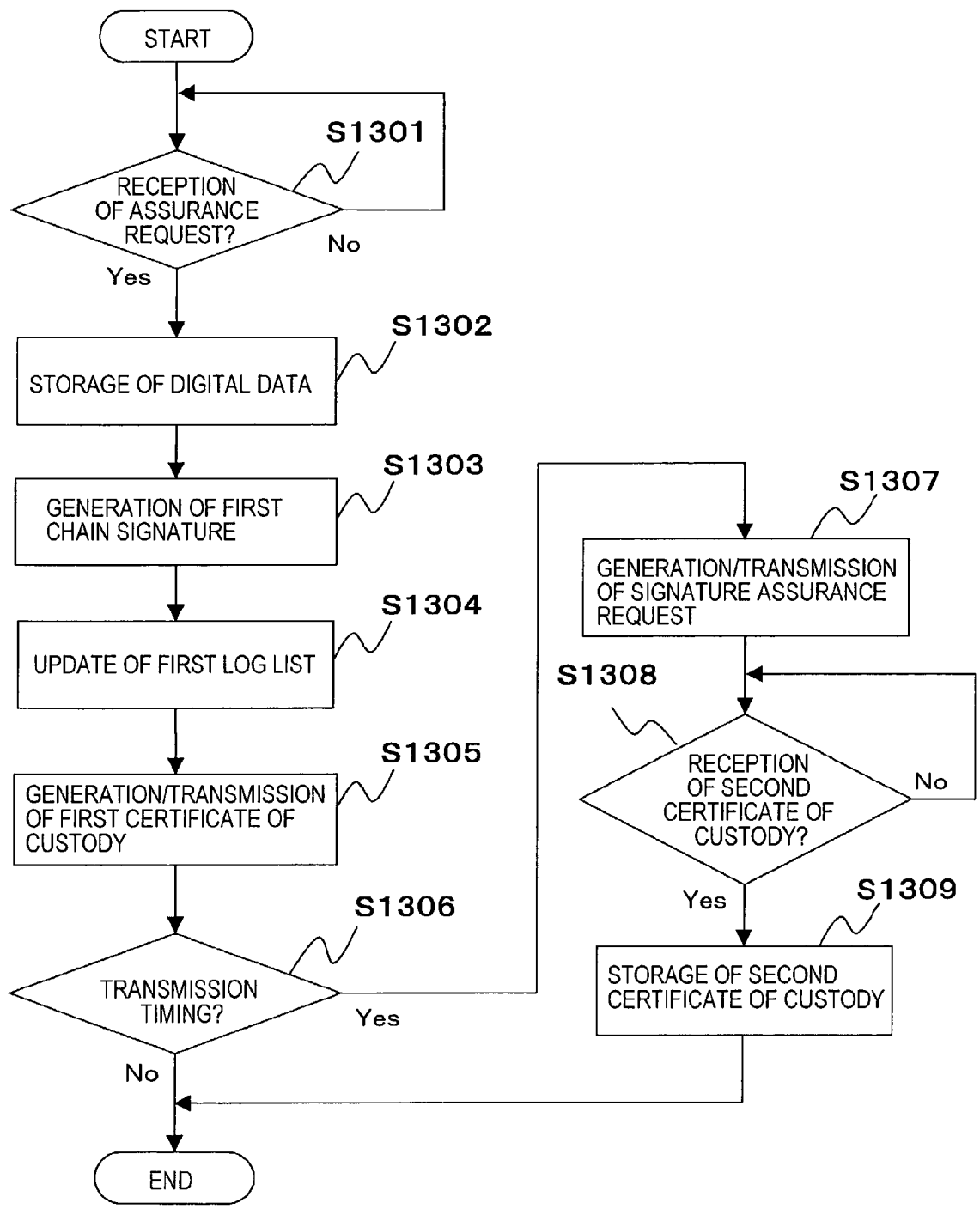
FIG. 13 is a flowchart for explaining operation of the first signature server 2 in the processing for assuring the original.

FIG. 13 is a flowchart for explaining an operation of the first signature server 2 in the original assurance processing.

Receiving an original assurance request from the client terminal 1 through the network IF unit 201 (S1301), the signature generation unit 202 gives a document ID to the digital data included in the request, and registers the document ID to the document storing unit 2041, associating the document ID with the digital data (S1302).

Next, the signature generation unit 202 applies the signature key, which is registered in the first signature server signature/verification key storing unit 2042, to a concatenation of the message digest of the newest ((n−1)-th) first chain signature registered in the first log list storing unit 2044 and the message digest of the digital data included in the original assurance request, to generate a digital signature. Then, the signature generation unit 202 assigns the concatenation of the message digest of the above-mentioned (n−1)-th first chain signature, the message digest of the digital data included in the above-mentioned request, and the generated digital signature, as an n-th first chain signature, and generates a first signature ID of this n-th first chain signature (S1303). Then, the signature generation unit 202 adds a new record 20445 in the first log list storing unit 2044, registering the first signature ID of the n-th first chain signature to the field 20441 of the record 20445, the n-th first chain signature to the field 20442, and the document ID of the digital data as the object of the signature to the field 20443. At this point of time, the signature generation unit 202 registers the flag indicating that the first chain signature in question has not been transmitted to the second signature server 3, to the field 20444 (S1304). Further, the signature generation unit 202 generates a first certificate of custody including the generated first chain signature, first signature ID and document ID, and sends the first certificate of custody to the client terminal 1 that is the sender of the original assurance request, through the network IF unit 201 (S1305).

Next, the signature generation unit 202 judges whether or not the generated first chain signature should be sent to the second signature server 3 (S1306). For example, a counter may be provided for counting the number of times first chain signatures are generated. And, when a count value of the counter arrives at a predetermined value, it is judged that the generated first chain signature is to be sent to the second signature server 3, and the count value of the counter is reset.

Now, when it is judged in S1306 that the generated first chain signature is sent to the second signature server 3, then, the signature generation unit 202 generates a signature assurance request that includes the first chain signature and the first signature ID. Then, the signature generation unit 202 sends the generated signature assurance request to the second signature server 3 through the network IF unit 201, and changes the registration content of the field 20444 of the record 20445 added in S1304 in the first log list storing unit 2044, into the flag indicating that the first chain signature has been transmitted to the second signature server 3 (S1307). Then, the signature generation unit 202 awaits a receipt of a second certificate of custody from the second signature server 3 through the network IF unit 201 (S1308), and stores the second certificate of custody into the certificate-of-custody storing unit 2045, associating it with the first chain signature in question (S1309). Then, the flow of the processing is ended. On the other hand, when it is judged in S1306 that the generated first chain signature should not be sent to the second signature server 3, then, the flow is ended at once.

Figure 14:
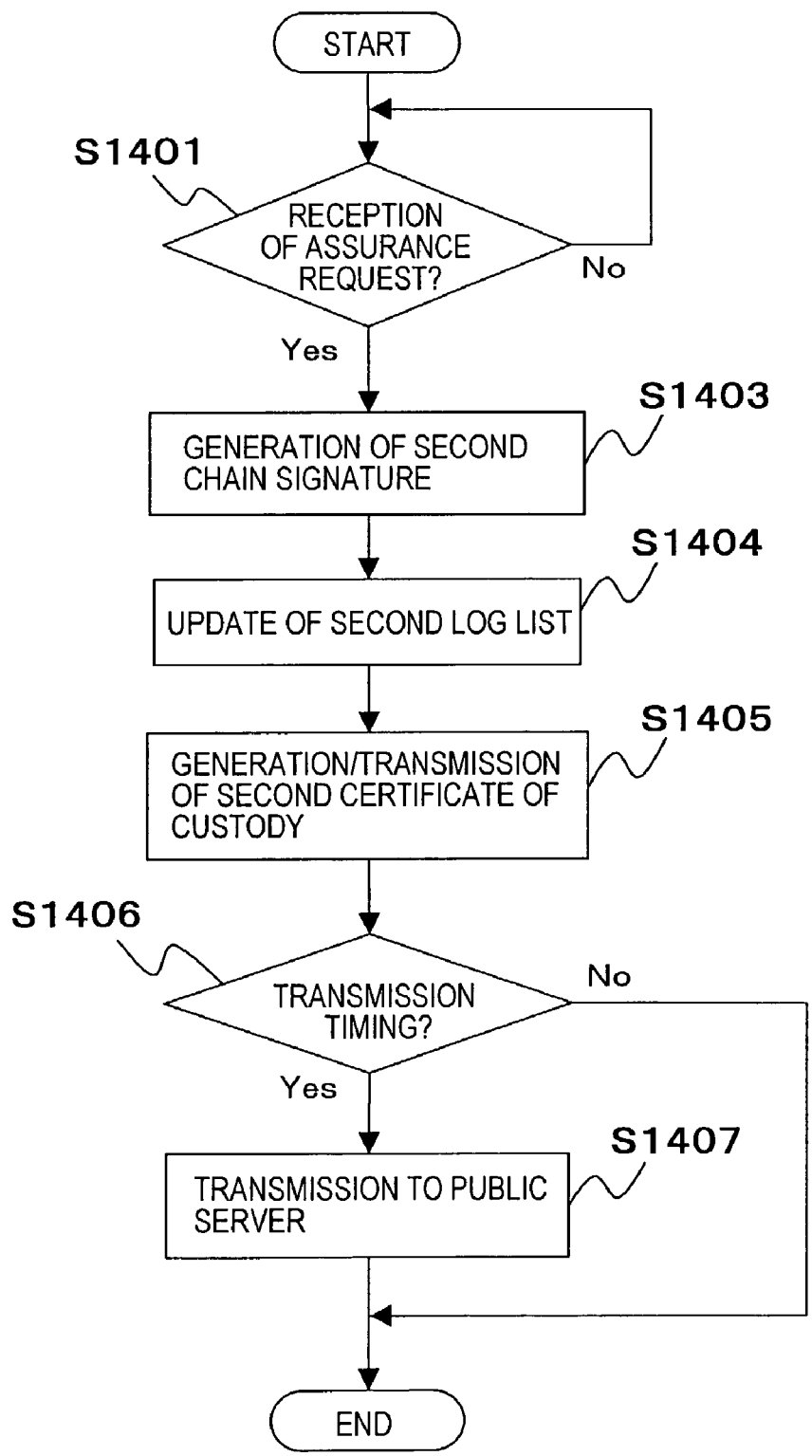
FIG. 14 is a flowchart for explaining operation of the second signature server 3 in the processing for assuring the original.

FIG. 14 is a flowchart for explaining an operation of the second signature server 3 in the original assurance processing.

When a signature assurance request is received from the first signature server 2 through the network IF unit 201 (S1401), then, the signature generation unit 302 applies the signature key registered in the second signature server signature key storing unit 3042 to a concatenation of the message digest of the newest ((j−1)-th) second chain signature registered in the second log list storing unit 3043 and the message digest of the first chain signature included in the signature assurance request, to generate a digital signature. Then, the signature generation unit 302 assigns the concatenation of the message digest of the above-mentioned (j−1)-th second chain signature, the message digest of the first chain signature included in the above-mentioned request, and the generated digital signature, as a j-th second chain signature, and generates a second signature ID of this j-th second chain signature (S1403). Then, the signature generation unit 302 adds a new record 30435 in the second log list storing unit 3043, registering the second signature ID of the j-th second chain signature to the field 30431 of the record 30435, the j-th second chain signature to the field 30432, and the first signature ID of the first chain signature as the object of the signature to the field 30433. At this point of time, the signature generation unit 302 registers the flag indicating that the second chain signature in question has not been sent to the public server 4, to the field 30434 (S1404). Further, the signature generation unit 302 generates a second certificate of custody including the generated second chain signature, the second signature ID, and the first signature ID, and sends the second certificate of custody to the first signature server 2 that is the sender of the signature assurance request, through the network IF unit 201 (S1405).

Next, the signature generation unit 302 judges whether or not the generated second chain signature should be sent to the public server 4 (S1406). For example, a counter may be provided for counting the number of times second chain signatures are generated. And, when a count value of the counter arrives at a predetermined value, it is judged that the generated second chain signature should be sent to the public server 4, and the count value of the counter is reset.

Now, when it is judged in S1406 that the generated second chain signature should be sent to the public server 4, then, the signature generation unit 302 generates an opening request that includes the second chain signature. Then, the signature generation unit 302 sends the opening request to the public server 4 through the network IF unit 301, and changes the registration content of the field 30434 of the record 30435 added in S1404 in the second log list storing unit 3043, into the flag indicating that the second chain signature has been sent to the public server 4. Further, the signature generation unit 303 registers a transmission log (the second signature ID of the transmitted second chain signature, the time and data of the transmission, the address of the public server 4 as the destination of the transmission, and the like) into the transmission log storing unit 3044 (S1407). Then, the flow of the processing is ended. On the other hand, when it is judged in S1406 that the generated second chain signature should not be sent to the public server 4, then, the flow is ended at once.

Here, the original assurance processing will be further explained.

Figure 15:
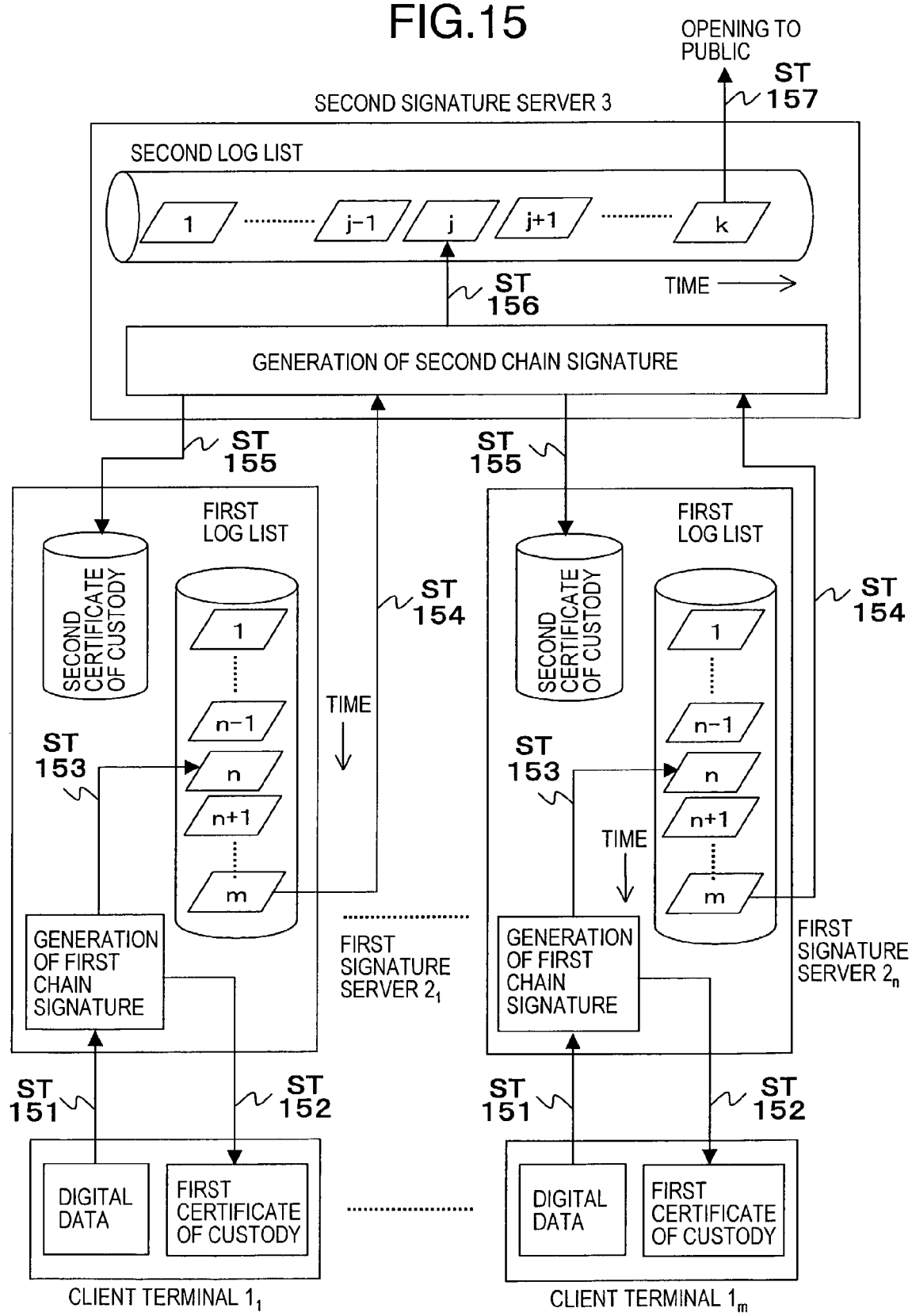
FIG. 15 is a diagram for explaining a flow of the processing for assuring the original.

FIG. 15 is a diagram for explaining a flow of the original assurance processing.

As shown in the figure, digital data is sent from the client terminal 1 to the first signature server 2, as to the digital data it is requested to assure the digital data is identical to the original, and the first signature server 2 generates a first chain signature (ST151). Then, a first certificate of custody, which includes this first chain signature, is returned to the client terminal 1 (ST152). Further, this first chain signature is added to the first log list (ST153).

Further, a first chain signature for which assurance of the signature is requested is sent from the first signature server 2 to the second signature server 3, and the second signature server 3 generates a second chain signature (ST154). Then, a second certificate of custody, which includes this second chain signature, is returned to the first signature server 2 concerned (ST155). Further, this second chain signature is added to the second log list (ST156). Further, a second chain signature in the second log list is sent from the second signature server 3 to the public server 4, to be opened there to the public.

Next, processing for confirming the original assurance (original confirmation processing) will be described.

Figure 16:
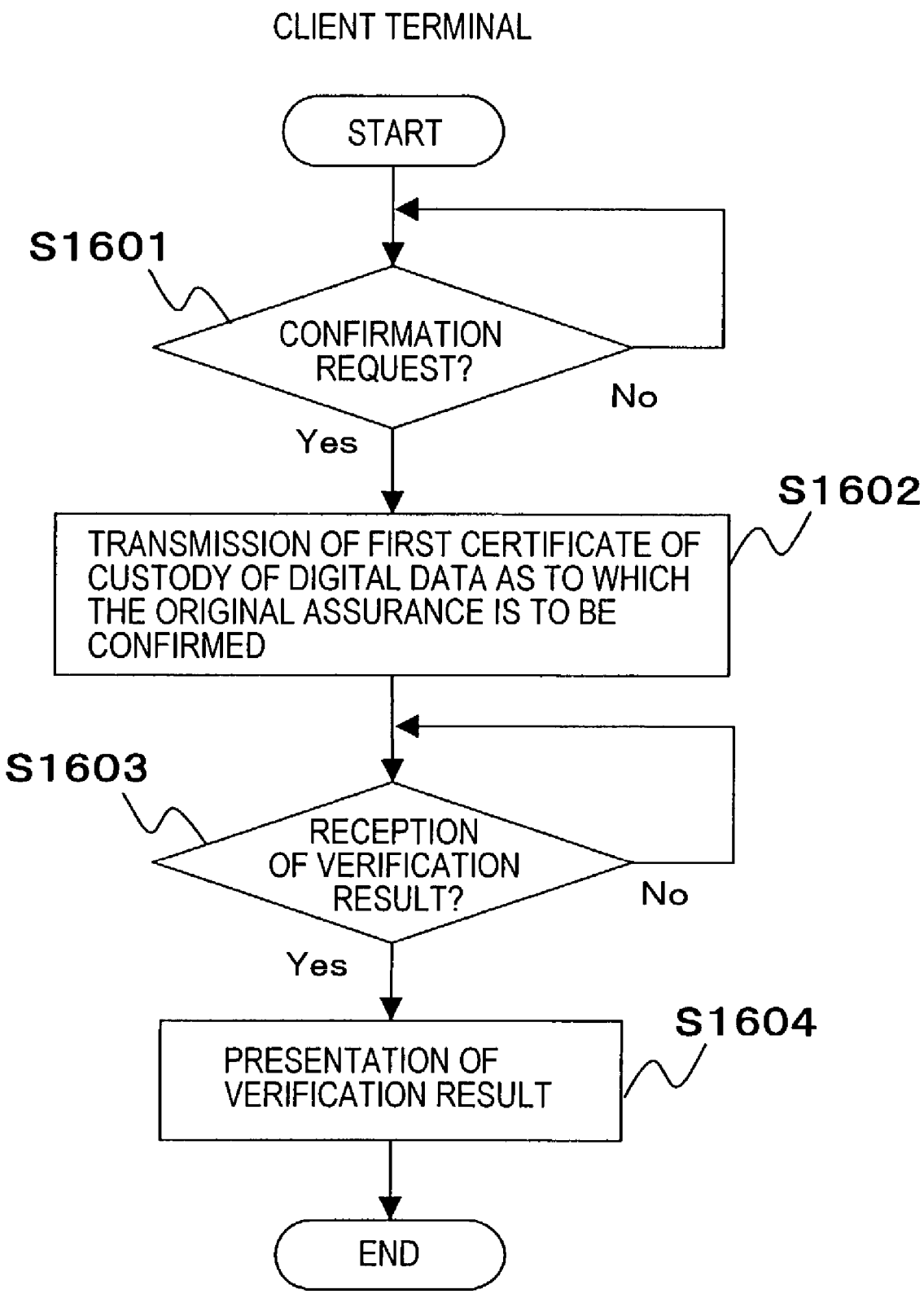
FIG. 16 is a flowchart for explaining operation of a client terminal 1 in processing for confirming the original.

FIG. 16 is a flowchart for explaining an operation of the client terminal 1 in the original confirmation processing.

Here, it is not necessary that the client terminal 1 that requests confirmation of original assurance with respect to certain digital data, is not the client terminal 1 that has requested to assure the digital data in question is identical to the original. For example, it is assumed that a contract document is prepared for making a sales contract. A certain client terminal 1 requests confirmation of original assurance with respect to the contract document, and receives a first certificate of custody. Thereafter, a user A of that client terminal 1 sends the contract document and the certificate of custody to a user B who is the counterpart of the contract. Then, in order to certify that the contract document is not tampered, the user B uses his client terminal 1 to make a request to the first signature server 2 for verification of confirmation of the original assurance with respect to the contract document. In such a case, the client terminal 1 that requests a confirmation of original assurance does not coincides with the client terminal 1 that requests the original assurance.

When a user requests a confirmation of original assurance through the user IF unit 102, with designation of digital data as to which confirmation of original assurance is requested (S1601), then, the request processing unit 104 reads from the storage unit 103, the designated digital data and the first certificate of custody associated with the designated digital data. Then, through the network IF unit 101, the request processing unit 104 sends the digital data and the first certificate of custody to the first signature server 2 that has generated the first certificate of custody (i.e., the first signature server 2 specified by the address associated with the first certificate of custody) (S1602).

Next, the request processing unit 104 awaits a receipt of a confirmation result (indicating existence or non-existence of tampering) through the network IF unit 101, from the first signature server 2 to which the original assurance confirmation request has been sent (S1603), and presents the confirmation result to the user through the user IF unit 102 (S1604).

Figure 17:
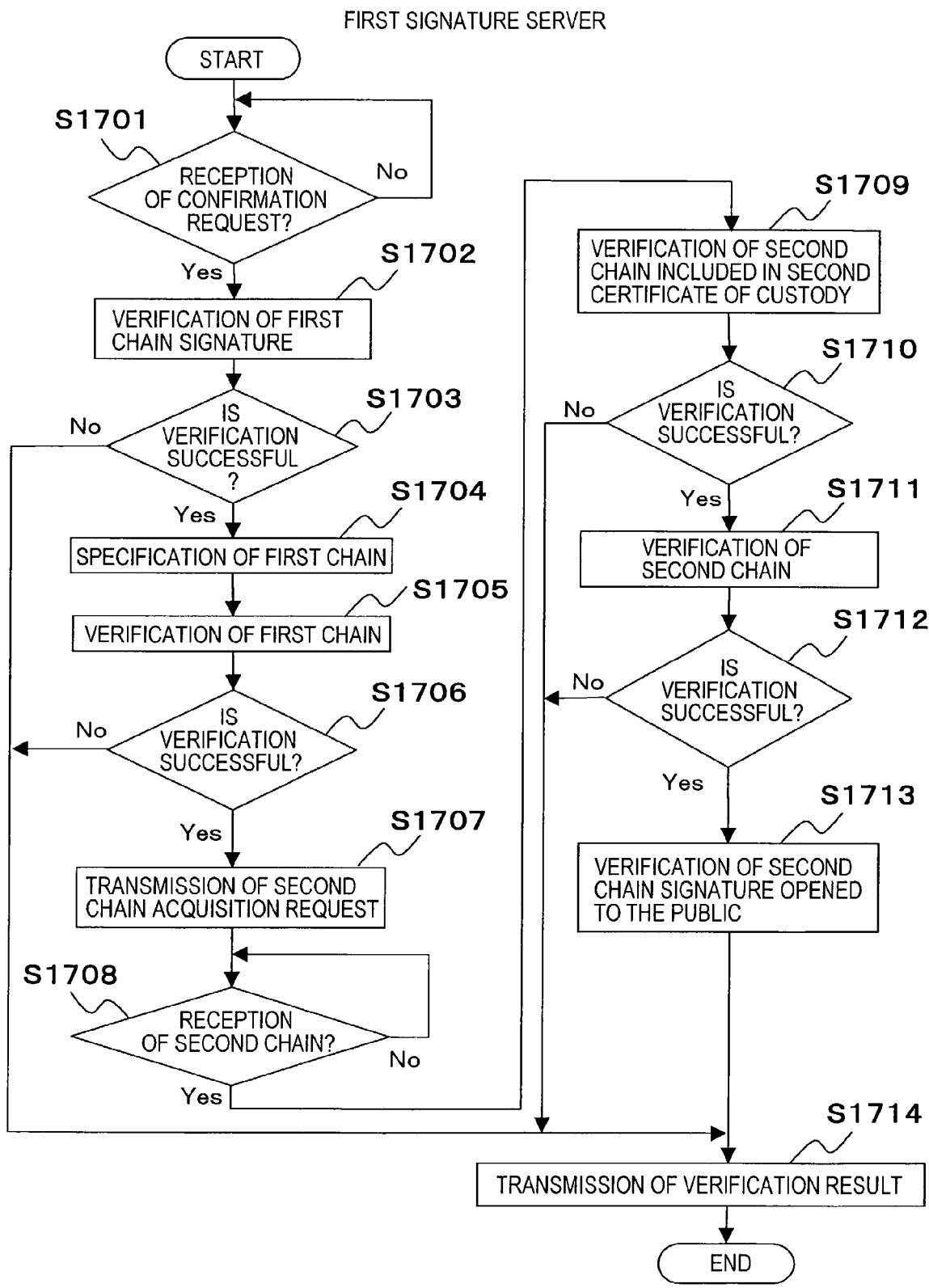
FIG. 17 is a flowchart for explaining operation of a first signature server 2 in the processing for confirming the original.

FIG. 17 is a flowchart for explaining an operation of the first signature server 2 in the original confirmation processing.

When an original assurance confirmation request is received together with a first certificate of custody and digital data from a client terminal 1 through the network IF unit 201 (S1701), the signature verification unit 203 verifies the digital data and the first chain signature included in the first certificate of custody (S1702).

In detail, assuming that the first chain signature included in the first certificate of custody is the h-th (h≧1) first chain signature, the signature verification unit 203 applies the verification key, which is registered in the first signature server signature/verification key storing unit 2042, to the digital signature included in the h-th first chain signature. Then, removing the message digest of the (h−1)-th first chain signature from the result of applying the verification key to the digital signature, the signature verification unit 203 compares the part without the removed portion (i.e., the message digest of the digital data), with the message digest of the digital data received together with the first certificate of custody from the client terminal 1.

When both message digests coincide, it is judged that the verification of the digital data thus transmitted and the first chain signature included in the received first certificate of custody is successful. On the other hand, when both message digests do not coincide, it is judged that the verification fails.

Further, when the verification is judged to be successful, the first chain signature included in the first certificate of custody may be compared with the first chain signature registered in the first log list storing unit 2044, in association with the first signature ID included in the first certificate of custody. When both first chain signatures coincide, it is judged that verification of the first chain signature included in the first certificate of custody is successful. On the other hand, when both first chain signatures do not coincide, it is judged that the verification fails.

Now, when the verification of the first chain signature fails (S1703), the signature verification unit 203 sends the confirmation result indicating existence of tampering, through the network IF unit 201, to the client terminal 1 that has sent the confirmation request (S1714).

On the other hand, when the verification of the first chain signature is successful (S1703), the signature verification unit 203 reads from the first log list storing unit 2044, the first chain (i.e., a group of records 20445 ranging from the h-th first chain signature to the i-th (i>h) first chain signature that is newer than the h-th first chain signature and has been sent to the second signature server 3, assuming that the first chain signature included in the first certificate of custody is the h-th (h≧1) first chain) (S1704).

Then, the signature verification unit 203 verifies this first chain, by verifying each of the first chain signatures from the h-th first chain signature to the i-th first chain signature of the first chain (S1705).

Here, the verification of each first chain signature from the h-th first chain signature to the i-th first chain signature is performed specifically as follows. Namely, when a first chain signature as an object of the verification is a d-th (h<d≦i) first chain signature, the message digest of the (d−1)-th first chain signature is compared with the message digest of the (d−1)-th first chain signature as a part of the d-th first chain signature. When both message digests coincide, it is judged that the verification of the d-th first chain signature is successful. And, when both message digests do not coincide, it is judged that the verification fails. Such processing is performed in turn for each first chain signature from the h-th first chain signature to the i-th first chain signature. When the verification is successful for all the first chain signatures, it is judged that the verification of the first chain is successful.

When the verification of the first chain fails (S1706), the signature verification unit 203 sends the confirmation result indicating existence of tampering, through the network IF unit 201, to the client terminal 1 that has sent the confirmation request (S1714).

On the other hand, when the verification of the first chain is successful (S1706), the signature verification unit 203 reads from the certificate-of-custody storing unit 2045, a second certificate of custody to the i-th first chain signature that is newer than the first chain included in the first certificate of custody and has been sent to the second signature server 3. Then, the signature verification unit 203 sends a second chain request accompanied by the second certificate of custody, to the second signature server 3 through the network IF unit 201 (S1707), and awaits a receipt of the second chain from the second signature server 3 (S1708).

Next, the signature verification unit 203 verifies the second chain signature that is included in the second certificate of custody sent to the second signature server 3 together with the second chain request (S1709). In detail, assuming that the second chain signature included in the second certificate of custody (which relates to the i-th first chain signature and has been sent to the second signature server 3) is an e-th (e≧1) second chain signature, the signature verification unit 203 applies the verification key registered in the second signature server verification key storing unit 2043 to the digital signature included in the e-th second chain signature. Then, removing the message digest of the (e−1)-th second chain signature from the result of applying the verification key to the digital signature, the signature verification unit 203 compares the part without the removed portion (i.e., the message digest of the first chain signature) with the message digest of the i-th first chain signature.

When both message digests coincide, it is judged that the verification of the second chain signature included in the second certificate of custody is successful. Otherwise, it is judged that the verification fails.

Further, when the verification is successful, the second chain signature included in the second certificate of custody is compared with the second chain signature that is included in the obtained second chain and has the second signature ID included in the second certificate of custody. When both second chain signatures coincide, it is judged that the verification is successful. Otherwise, it is judged that the verification fails.

Now, when the verification of the second chain signature included in the second certificate of custody fails (S1710), the signature verification unit 203 sends the confirmation result indicating existence of tampering, through the network IF unit 201, to the client terminal 1 that has sent the confirmation request (S1714).

On the other hand, when the verification of the second chain signature is successful (S1710), the signature verification unit 203 verifies the second chain, by verifying each of the second chain signatures from the e-th second chain signature to the f-th second chain signature (the second chain signature sent to the public server 4) in the received second chain (S1711).

Here, the verification of each of the second chain signatures from the e-th second chain signature to the f-th second chain signature is performed specifically as follows. Namely, when a second chain signature as an object of the verification is a c-th (e<c≦f) second chain signature, the message digest of the (c−1)-th second chain signature is compared with the message digest of the (c−1)-th second chain signature as a part of the c-th second chain signature. When both message digests coincide, it is judged that the verification of the c-th second chain is successful. Otherwise, it is judged that the verification fails. Such processing is performed in turn for each of the second chain signatures from the e-th second chain to the f-th second chain signature. When the verification is successful for all the second chain signatures, it is judged that the verification of the second chain is successful.

When the verification of the second chain fails (S1712), the signature verification unit 203 sends the confirmation result indicating existence of tampering, through the network IF unit 201, to the client terminal 1 that has sent the confirmation request (S1714).

On the other hand, when the verification of the second chain is successful (S1712), the signature verification unit 203 verifies the f-th second chain signature included in the second chain, i.e., the second chain signature sent to the public server 4 (S1713). For example, the f-th second chain signature opened by the public server 4 is acquired from that server 4 and compared with the f-th second chain included in the second chain.

When both second chain signatures do not coincide, the signature verification unit 203 judges that the verification fails, and sends the confirmation result indicating existence of tampering, through the network IF unit 201, to the client terminal 1 that has sent the confirmation request. On the other hand, when both second chain signatures coincide, it is judged that the verification is successful. This means that all the verifications are successful. Thus, the signature verification unit 203 sends the confirmation result indicating non-existence of tampering, through the network IF unit 201, to the client terminal 1 that has sent the confirmation request (S1714).

Here, when the confirmation result indicating existence of tampering is sent to the client terminal 1, it may be preferable to send its reason (indicating which step leads to the judgment of fails of verification) at the same time.

Figure 18:
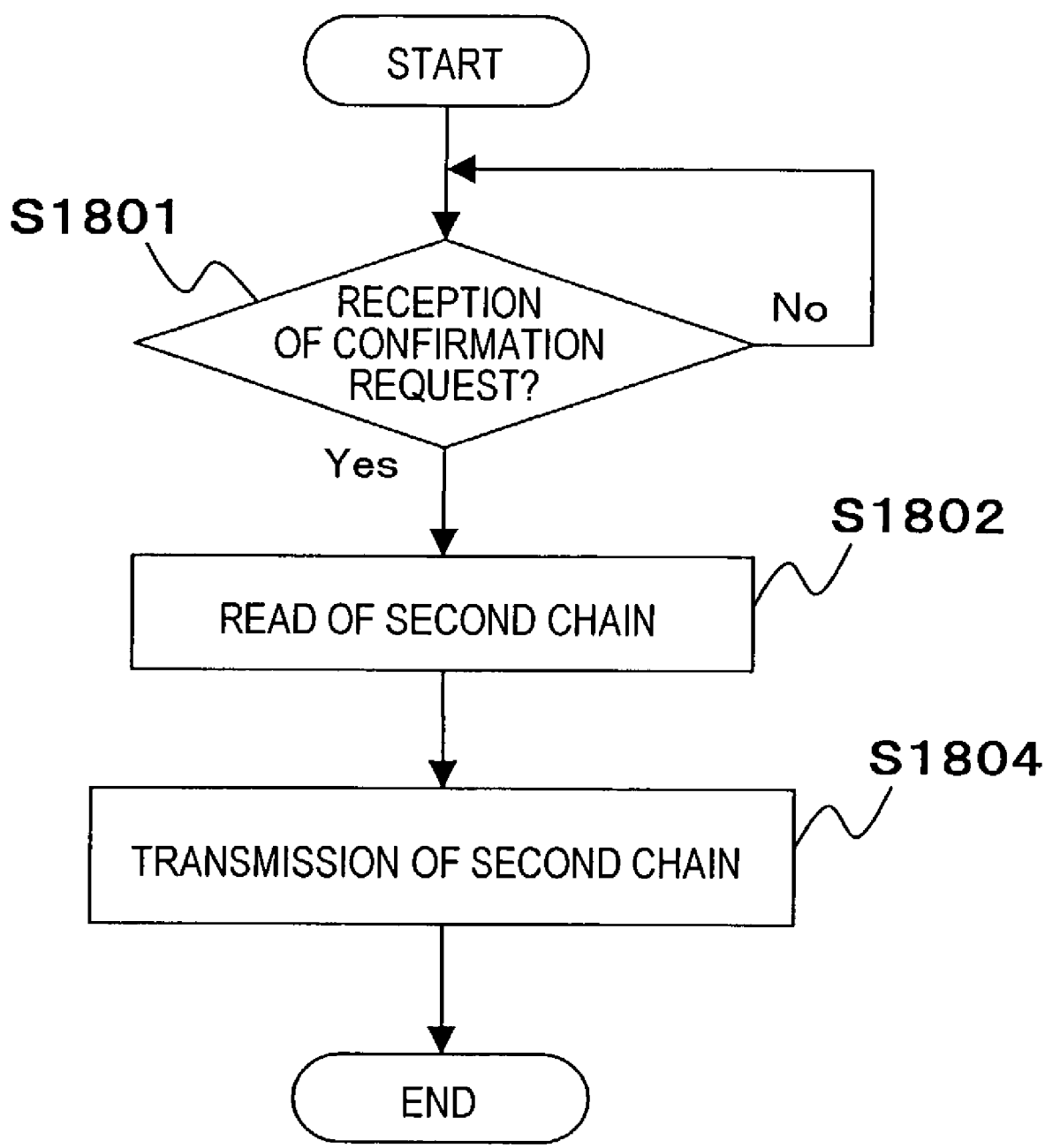
FIG. 18 is a flowchart for explaining operation of the second signature server 3 in the processing for confirming the original.

FIG. 18 is a flowchart for explaining an operation of the second signature server 3 in the original confirmation processing.

When the signature verification unit 303 receives a signature assurance confirmation request together with a second certificate of custody, from the first signature server 2 through the network IF unit 301 (S1801), then, the signature verification unit 303 reads from the second log list storing unit 3043, the second chain (i.e., a group of records 30435 ranging from the e-th second chain signature included in the second certificate of custody to the f-th second chain signature that is newer than the e-th second chain signature and has been sent to the public server 4) (S1802). Then, the second chain thus read is sent to the first signature server 2 that has sent the signature assurance confirmation request (S1804).

Here, the original confirmation processing will be further explained.

Figure 19:
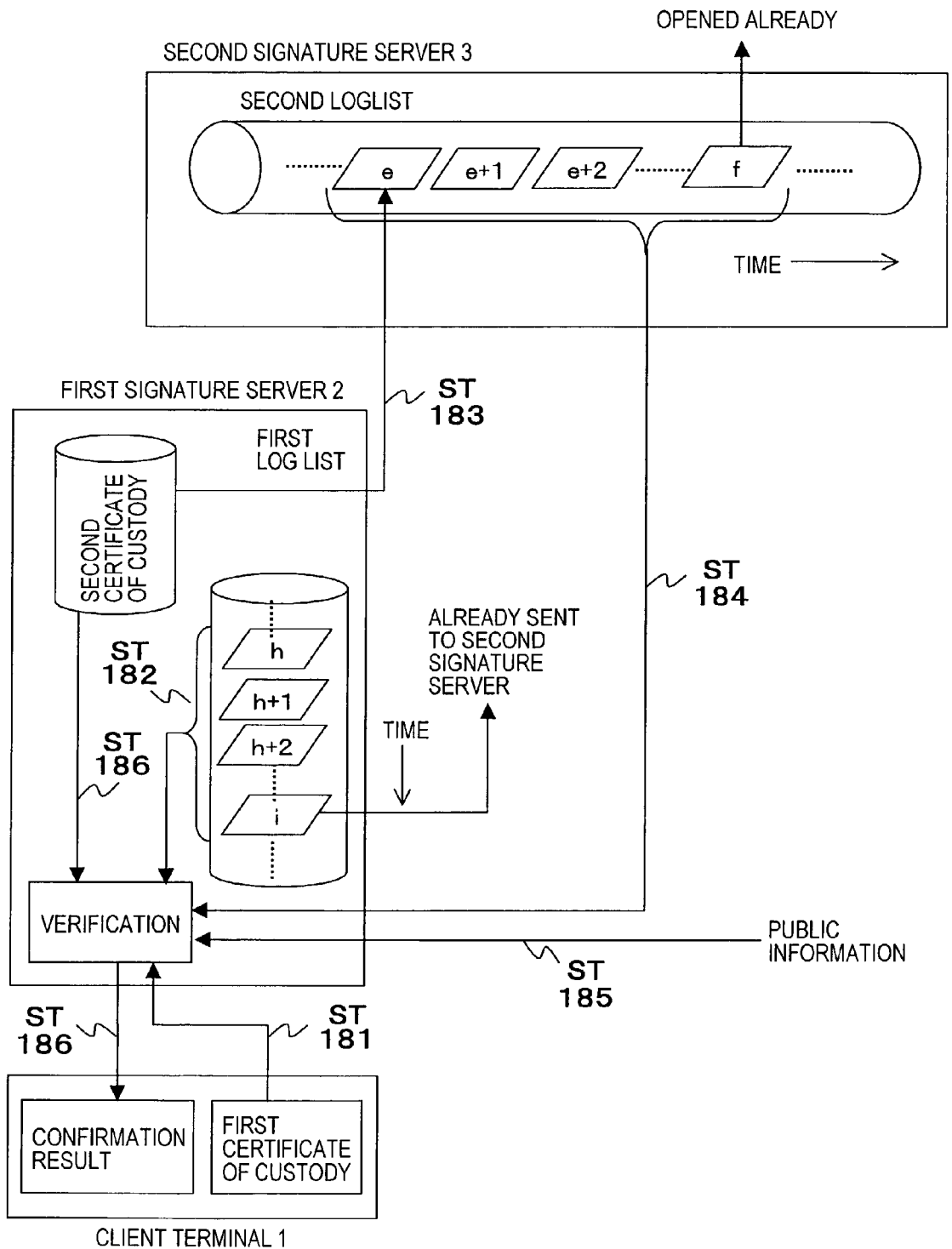
FIG. 19 is a diagram for explaining a flow in the processing for confirming the original.

FIG. 19 is a diagram for explaining a flow in the original confirmation processing.

As shown in the figure, the client terminal 1 sends a first certificate of custody to digital data as to which a confirmation of the original assurance is requested, to the first signature server 2, and the first signature server 2 verifies the first chain signature included in the first certificate of custody (ST181). Next, the first chain (which comprises records 20445 ranging from the first chain signature (the h-th first chain signature) included in the first certificate of custody to the first chain signature (the i-th first chain signature) that is newer than the h-th first chain signature and has been sent to the second signature server 3) is read from the first log list storing unit 2044, and this first chain is verified (ST182).

Then, the second certificate of custody with respect to the i-th first chain signature transmitted to the second signature server 3 is sent from the first signature server 2 to the second signature server 3 (ST183). Receiving the second certificate of custody, the second signature server 3 reads from the second log list storing unit 3043, the second chain (which comprises the records 30435 ranging from the second chain signature (the e-th second chain) included in the second certificate of custody to the second chain signature (the f-th second chain signature) that is newer than the e-th second chain signature and has been sent to the public server 4), and sends the second chain to the first signature server 2 (ST184). Then, the first signature server 2 verifies the second chain signature included in the second certificate, and verifies the second chain. Further, using public information acquired from the public server 4, the second chain signature that is included in the second chain and has been opened to the public by the public server 4 is verified (ST185). Thus-obtained verification (confirmation) result is sent from the first signature server 2 to the client terminal 1 (ST186).

Hereinabove, one embodiment of the present invention has been described.

According to the present embodiment, even in a system where, for the sake of distribution of loads, a plurality of first signature servers 2 are provided for generating first chain signatures and storing first log lists, only the second signature server 3 takes the work of transmission to the public server 4. Accordingly, it is possible to prevent increase of work required for opening lists to the public, even when the number of servers increases.

The present invention is not limited to the above-described embodiment, and can be modified variously within the scope of the invention.

For example, the above-described embodiment has been described taking an example in the first signature server 2 verifies the second chain and second chain signatures included in the second chain (the e-th second chain signature included in the second certificate of custody sent from the first signature server 2 to the second signature server 3, and the f-th second chain signature sent from the second signature server 3 to the public server 4) (See S1707-S1713 of FIG. 17). However, the second signature server 3 may verify a second chain and the second chain signatures included in the second chains.

Figure 20:
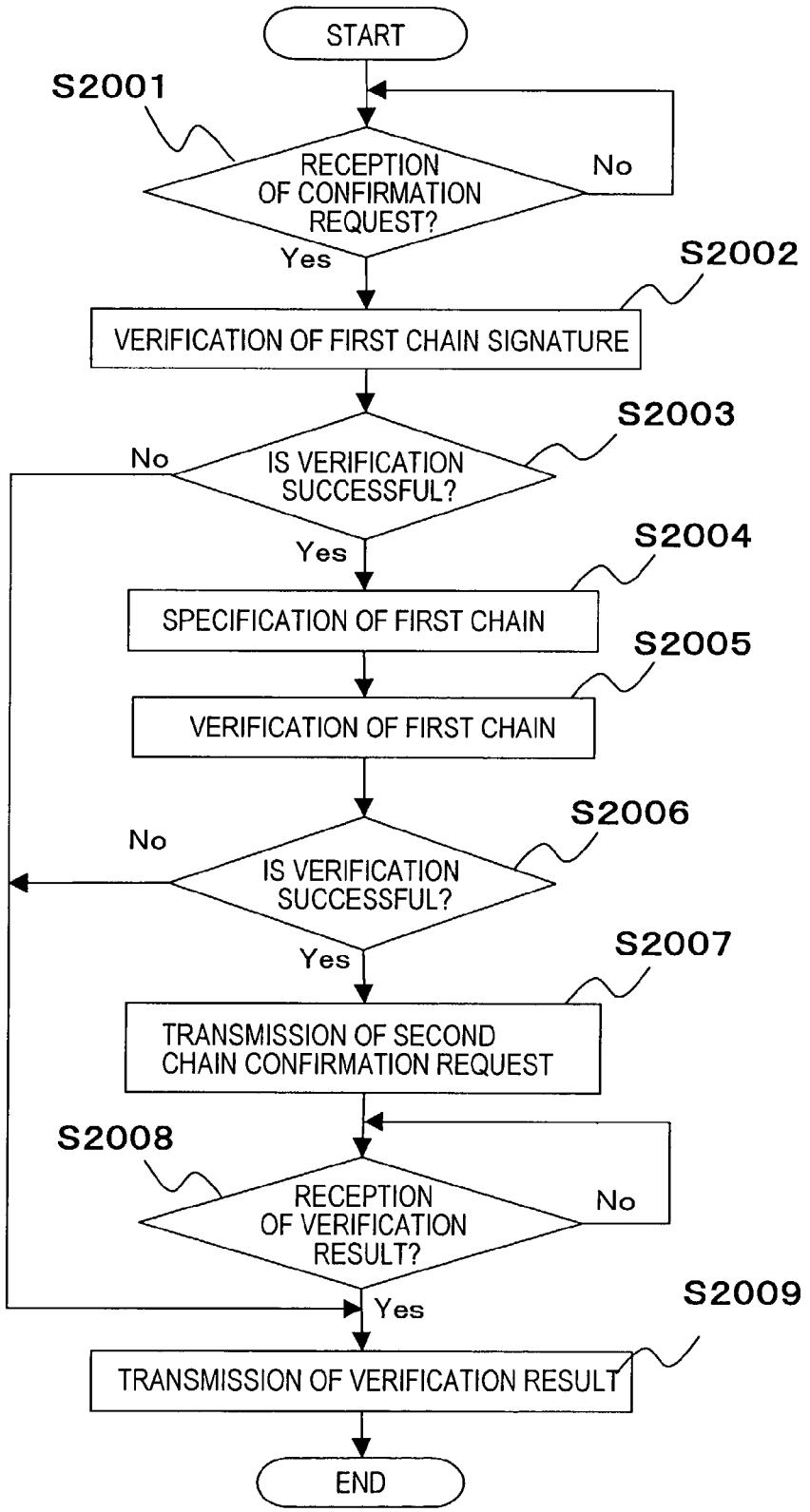
FIG. 20 is a flowchart for explaining a variation of the operation of the first signature server 2 in the processing for confirming the original.

In that case, FIG. 20 shows operation of the first signature server 2 in the original confirmation processing. Here, S2001-S2006 are same as S1701-S1706 of FIG. 17. When verification of the first chain is successful in S2006, the signature verification unit 203 sends a second chain verification request accompanied with a second certificate of custody to the second server 3 through the network IF unit 201 (S2007), and awaits receipt of a verification result from the second signature server 3 (S2008). Then, the result is sent to the client terminal 1 (S2009).

Figure 21:
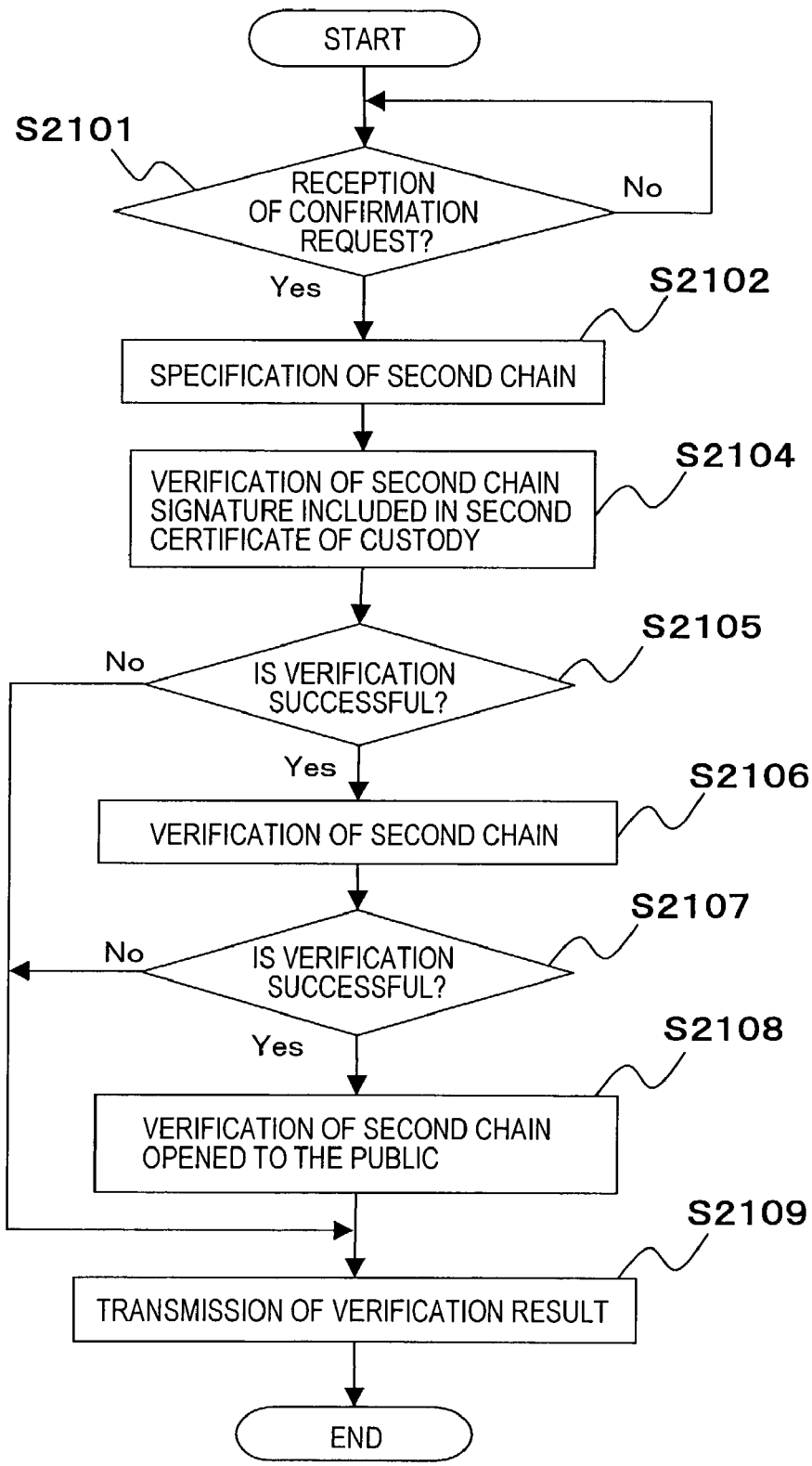
FIG. 21 is a flowchart for explaining a variation of the operation of the second signature server 3 in the processing for confirming the original.

Further, FIG. 21 shows operation of the second signature server 3 in the original confirmation processing of the above case. Here, S2101-S2102 are same as the S1801-S1802 of FIG. 18. Further, S2104-S2108 are same as S1709-S1713 of FIG. 17, and the processing in those steps is performed by the signature verification unit 303 of the second signature server 3. The verification result is sent to the first signature server 2 (S2109).

Further, in the above-described embodiment, the servers 2-4 each may be implemented on a system comprising a plurality of computers connected with one another through a network. For example, a first signature server 2 may be divided into servers, i.e., a server for generating signatures, a server for storing generated signatures, and a server for verifying signatures.

Further, the above-described embodiments have been described taking an example in which the original assurance system comprises the two layers, i.e., a plurality of first signature servers and the second signature server that supervises those first signature servers. However, the present invention is not limited to this. For example, there may be provided a plurality of second signature servers, each of which supervises a plurality of first signature servers, and a third signature server that supervises the mentioned plurality of second signature servers and sends information opening requests to a public server. Thus, the present invention can be applied to a case where layers of signature servers constitute the original assurance system.

As described above, when validity of the original is to be assured using log lists of chain signatures, the present invention can reduce work of opening the lists to the public.

What is claimed is:

1. An original assurance method for assuring validity of original data using a plurality of first signature servers and a second signature server supervising said plurality of first signature servers, said method comprising:

generating signatures for assuring validity of the original data; and performing verification of validity of the original data;

wherein in the step of generating signatures for assuring validity, each of said plurality of first signature servers performs:

a first log list registration step, when the first signature server receives digital data, of generating a digital signature for concatenation of said digital data and a first chain signature registered in a first log list, and adding said generated digital signature to said first log list;

a first receipt transmission step of sending a first receipt including said first chain signature to a sender of the digital data; and a second receipt reception step of sending the first chain signature in said first log list to said second signature server, receiving a second receipt to the first chain signature from said second signature server, and storing said second receipt; and wherein in the step of generating signatures for assuring validity, said second signature server performs:

a second log list registration step, when the second signature server receives a first chain signature from one of said plurality of first signature servers, of generating a digital signature for a concatenation of the first chain signature and a second chain signature registered in a second log list, and adding the generated digital signature to said second log list;

a second receipt transmission step of sending a second receipt including said second chain signature to said one of said plurality of first signature servers; and a transmission management step of sending a second chain signature in said second log list to an external server;

wherein in the step of performing verification of validity of the original data, each of said plurality of first signature servers performs:

a first log list verification step, when the first signature server receives a first receipt with respect to original data, as an object of verification, of verifying each of first chain signatures ranging from a first chain signature included in said first receipt to a first chain signature that has been sent to said second signature server; and a second receipt transmission step of sending a second receipt to said second signature server, wherein the second receipt is received from said second signature server by sending the first chain signature to said second signature server; and wherein in the step of performing verification of validity of the original data, said second signature server performs:

a second log list verification step, when the second signature server receives the second receipt from said first signature server, of verifying each of second chain signatures ranging from a second chain signature included in said second receipt to a second chain signature sent to said external server.

2. The original assurance method according to claim 1, wherein:

said external server holds the second chain signature received from said second signature server, in a state in which a browser terminal can browse at least said second chain signature.

3. The original assurance method according to claim 1, wherein:

in the step of performing said verification of validity of the original data, each of said first signature servers performs a step of comparing the first chain signature included in the first receipt with respect to the original data, as the object of verification, with the first chain signature registered in said first log list, to verify said first chain signature.

4. The original assurance method according to claim 1, wherein:

in the step of performing said verification of validity of the original data, said second signature server performs a step of comparing the second chain signature included in said second receipt received from said first signature server, with the second chain signature registered in a part of said second log list, to verify said second chain signature.

5. The original assurance method according to claim 1, wherein:

in the step of performing said verification of validity of the original data, said second signature server performs a step of acquiring the second chain signature that the second signature server has sent to said external server, and a step of comparing the acquired second chain signature with the second chain signature registered in a part of said second log list, to verify said second chain signature.

6. A computer-readable storage device, tangibly embodying a program of instructions operable on a computer to execute each of the steps performed by said first signature server in the original assurance method according to claim 1.

7. A computer-readable storage device, tangibly embodying a program of instructions operable on a computer to execute each of the steps performed by said second signature server in the original assurance method according to claim 1.

8. An original assurance system that assures validity of original data, comprising:
a plurality of first signature servers; and
a second signature server supervising said plurality of first signature servers;
wherein each of said plurality of first signature servers comprises:
a signature generation unit for generating, when the first signature server in question receives digital data as original data, as an object of assurance, a digital signature for a concatenation of said digital data and a first chain signature registered in a first log list, and adds the generated digital signature to said first log list, which is stored in a storage unit, associating said first chain signature with said digital data;
a network interface unit for sending a first receipt including said first chain signature to a sender of the digital data; and
a network interface unit for sending a first chain signature in said first log list to said second signature server, receiving a second receipt to said first chain signature from said second signature server, and storing said second receipt in the storage unit; and
wherein said second signature server comprises:
a signature generation unit for generating, when the second signature server receives a first chain signature from one of said plurality of first signature servers, a digital signature for a concatenation of the first chain signature and a second chain signature registered in a second log list, and adding said digital signature as a second chain signature to said second log list, which is stored in a storage unit;
a network interface unit for sending a second receipt including said second chain signature to said one of said plurality of first signature servers; and
a network interface unit for sending second chain signature in said second log list to an external server;
wherein each of said plurality of first signature servers further comprises:
a signature verification unit for verifying, when the first signature server receives a first receipt with respect to original data, as an object of verification, each of first chain signatures ranging from a first chain signature included in said first receipt to a first chain signature that has been sent to said second signature server; and
a network interface unit for sending to said second signature server a second receipt, which is received from said second signature server by sending the first chain signature to said second signature server; and wherein said second signature server further comprises:
a signature verification unit for verifying, when the second signature server receives the second receipt from said first signature server, each of second chain signatures ranging from a second chain signature included in said second receipt to a second chain signature sent to said external server.

9. A first signature server used in an original assurance system that assures validity of original data comprising:
a signature generation unit for generating, when the first signature server receives digital data as original data, as an object of assurance, a digital signature for a concatenation of said digital data and a first chain signature registered in a first log list, and adding the generated digital signature to said first log list, which is stored in a storage unit, associating said first chain signature with said digital data;
a network interface unit for sending a first receipt including said first chain signature to a sender of the digital data;
a network interface unit for sending a first chain signature in said first log list to a second signature server, receiving second receipt to said first chain signature from said second signature server, and storing said second receipt in the storage unit;
a signature verification unit for verifying, when the first signature server receives a first receipt with respect to original data, as an object of verification, each of first chain signatures ranging from a first chain signature included in said first receipt to a first chain signature that has been sent to said second signature server; and
a network interface unit for sending to said second signature server a second receipt, which is received from said second signature server by sending the first chain signature to said second signature server.

10. A second signature server used in an original assurance system that assures validity of original data, comprising:
a signature generation unit for generating, when the second signature server receives a first chain signature from one of a plurality of first signature servers, a digital signature for a concatenation of the first chain signature and a second chain signature registered in a second log list, and adding the generated digital signature to said second log list, which is stored in a storage unit;
a network interface unit for sending a second receipt including said second chain signature to said one of said plurality of first signature servers;
a network interface unit for sending a second chain signature in said second log list to an external server; and
a signature verification unit for verifying, when the second signature server receives the second receipt from said first signature server, each of second chain signatures ranging from a second chain signature included in said second receipt to a second chain signature sent to said external server.

* * * * *